United States Patent
Tetsuka et al.

(10) Patent No.: US 9,322,725 B2
(45) Date of Patent: Apr. 26, 2016

(54) PEDALING FORCE MEASUREMENT DEVICE

(71) Applicants: Shimano Inc., Sakai, Osaka (JP); MINEBEA CO., LTD., Kitasaku-gun, Nagano (JP)

(72) Inventors: Toshio Tetsuka, Osaka (JP); Satoshi Sato, Nagano (JP); Toru Arai, Nagano (JP); Kui Li, Nagano (JP)

(73) Assignees: Shimano Inc., Osaka (JP); Minebea Co., Ltd., Nagano (JP)

( * ) Notice: Subject to any disclaimer, the term of this patent is extended or adjusted under 35 U.S.C. 154(b) by 387 days.

(21) Appl. No.: 13/959,418

(22) Filed: Aug. 5, 2013

(65) Prior Publication Data
US 2014/0060212 A1 Mar. 6, 2014

(30) Foreign Application Priority Data
Aug. 28, 2012 (JP) ................................. 2012-188126

(51) Int. Cl.
| G01L 1/22 | (2006.01) |
| G01L 3/24 | (2006.01) |
| G01L 5/16 | (2006.01) |

(52) U.S. Cl.
CPC . *G01L 1/22* (2013.01); *G01L 3/247* (2013.01); *G01L 5/16* (2013.01)

(58) Field of Classification Search
CPC ............ G01L 1/04; G01L 1/22; G01L 1/2231
USPC .................................................... 73/862.627
See application file for complete search history.

(56) References Cited

U.S. PATENT DOCUMENTS

| 4,463,433 | A | 7/1984 | Hull et al. | |
| 5,027,303 | A | 6/1991 | Witte | |
| 6,340,067 | B1 | 1/2002 | Fujiwara et al. | |
| 6,418,797 | B1 * | 7/2002 | Ambrosina | B62M 6/40 73/862.29 |
| 7,861,599 | B2 | 1/2011 | Meggiolan | |
| 8,065,926 | B2 | 11/2011 | Meyer | |
| 8,387,470 | B2 * | 3/2013 | Tuulari | G01L 1/2237 73/862.627 |
| 8,584,529 | B2 * | 11/2013 | Fisher | B62M 3/00 73/760 |
| 8,800,389 | B2 * | 8/2014 | Tetsuka | B62M 3/00 73/862 |
| 8,881,608 | B2 * | 11/2014 | Tetsuka | B62M 3/16 73/862 |

(Continued)

FOREIGN PATENT DOCUMENTS

| CN | 1442680 A | 9/2003 |
| CN | 101279629 A | 10/2008 |
| DE | 44 35 174 A1 | 3/1996 |

(Continued)

*Primary Examiner* — Lisa Caputo
*Assistant Examiner* — Octavia Hollington
(74) *Attorney, Agent, or Firm* — Global IP Counselors

(57) ABSTRACT

A first pedaling force measurement device measures a plurality of pedaling force parameters acting on a first crank arm to one end of which a first pedal can be attached and to another end of which a crank shaft can be attached. The first pedaling force measurement device is provided with a strain-flexing part, a first parameter detection part and a first interference suppression part. Strain acting on the first crank arm is conveyed to the strain-flexing part. The parameter detection part is disposed on the strain-flexing part, and detects a plurality of parameters based on the strain being conveyed to the strain-flexing part. The interference suppression part suppresses interference in one parameter detected by the parameter detection part from the other parameters.

23 Claims, 14 Drawing Sheets

(56) References Cited

U.S. PATENT DOCUMENTS

| | | | |
|---|---|---|---|
| 2010/0093494 A1* | 4/2010 | Smith | B62M 6/50 482/8 |
| 2010/0263468 A1 | 10/2010 | Fisher et al. | |

FOREIGN PATENT DOCUMENTS

| | | |
|---|---|---|
| DE | 699 35 750 T2 | 8/2007 |
| DE | 10 2009 029 633 A1 | 3/2011 |
| EP | 2058637 A2 | 5/2009 |
| JP | 3047816 U | 2/1998 |
| WO | 2009/006673 A1 | 1/2009 |
| WO | 2011/030215 A1 | 3/2011 |
| WO | 2011/135972 A1 | 11/2011 |
| WO | 2012/053114 A1 | 4/2012 |
| WO | 2012/056510 A1 | 5/2012 |
| WO | 2012/056522 A1 | 5/2012 |
| WO | 2012/056558 A1 | 5/2012 |

* cited by examiner $$DL = \frac{\Sigma(LF\theta)}{\Sigma\sqrt{LF\theta^2 + LFr^2 + LFz^2}} = \frac{\text{SUM OF } LF\theta \text{ DURING ONE ROTATION OF SECOND CRANK ARM}}{\text{SUM OF } LF \text{ DURING ONE ROTATION OF SECOND CRANK ARM}}$$

$$DR = \frac{\Sigma(RF\theta)}{\Sigma\sqrt{RF\theta^2 + RFr^2 + RFz^2}} = \frac{\text{SUM OF } RF\theta \text{ DURING ONE ROTATION OF FIRST CRANK ARM}}{\text{SUM OF } RF \text{ DURING ONE ROTATION OF FIRST CRANK ARM}}$$

$$D = \frac{\Sigma(LF\theta + RF\theta)}{\Sigma\left(\sqrt{LF\theta^2 + LFr^2 + LFz^2} + \sqrt{RF\theta^2 + RFr^2 + RFz^2}\right)} = \frac{(\text{SUM OF } F\theta \text{ DURING ONE CRANK ROTATION})}{(\text{SUM OF } F \text{ DURING ONE CRANK ROTATION})}$$

$LF\theta$ : $F\theta$ OF SECOND CRANK ARM
$LFr$ : $Fr$ OF SECOND CRANK ARM
$LFz$ : $Fz$ OF SECOND CRANK ARM
$LF$ : COMPOSITE VECTOR FOR SECOND CRANK ARM
$F$ : SUM OF $LF$ AND $RF$ $RF\theta$ : $F\theta$ OF FIRST CRANK ARM
$RFr$ : $Fr$ OF FIRST CRANK ARM
$RFz$ : $Fz$ OF FIRST CRANK ARM
$RF$ : COMPOSITE VECTOR FOR FIRST CRANK ARM

FIG. 20

PEDALING FORCE MEASUREMENT DEVICE

GROSS-REFERENCE TO RELATED APPLICATIONS

This application claims priority to Japanese Patent Application No. 2012-188126, filed on Aug. 28, 2012. The entire disclosure of Japanese Patent Application No. 2012-188126 is hereby incorporated herein by reference.

BACKGROUND

1. Field of the Invention

This invention generally relates to a pedaling force measurement device for measuring a plurality of parameters for pedaling force acting on a crank arm having a pedal attachable on one end and a crankshaft attachable on the other end, the pedaling force being due to the pedal being pushed.

2. Background Information

Pedaling force measurement devices are known in the prior art for measuring pedaling force acting on a bicycle crank arm in terms of a plurality of parameters due to a pedal being pushed (for example, see PCT International Publication No. WO/2011/030215). In a conventional pedaling force measurement device, parameters in the for of a vertical force component of the bending moment, a longitudinal force component of the bending moment, and the position of the pedal in the pedal axial direction acting on the crank arm are measured using a strain gauge. The measured parameters are displayed on a display device.

SUMMARY

It is difficult to measure a single parameter, such as a bending moment force component, with high precision using a conventional pedaling force measurement device due to the influence of the other parameters.

A pedaling force measurement device according to a first aspect of the present invention measures a plurality of parameters of pedaling force acting on a crank arm. The pedaling force measurement device comprising a strain-flexing part, a parameter detection part and an interference suppression part. The strain-flexing part is configured to receive a strain acting on the crank arm from pedaling. The parameter detection part is disposed on the strain-flexing part to detect the parameters from the strain acting on the strain-flexing part. The interference suppression part is configured to suppress interference from one parameter detected by the parameter detection part from other ones of the parameters.

When a crankshaft is mounted to another end of the crank arm of the pedaling force measurement device, a pedal is mounted to one end of the crank arm, and the pedal is pushed, a plurality of pedaling force parameters are detected and measured. At this time, errors in the detected output for one parameter may arise due to one parameter being subjected to interference from the other parameters. Such interference is suppressed by the interference suppression part. It is thus possible to precisely measure pedaling force parameters.

A pedaling force measurement device according to a second aspect of the present invention is the pedaling force measurement device according to the first aspect, wherein the parameter detection part comprises a second strain sensor and a third strain sensor. The second strain sensor is configured to detect a second force component, corresponding to a crank arm longitudinal force component of a bending moment due to a load acting upon the crank arm from pedaling, as one of the parameters. The third strain sensor is configured to detect a third force component, corresponding to a pedal axial direction force component of the bending moment due to the load acting upon the crank arm from pedaling, as one of the parameters. In this case, the second force component, which constitutes a force component in the longitudinal direction, i.e., the direction of tension, can be detected by the second strain sensor, and the third force component, which constitutes the pedal axial direction force component, by the third strain sensor.

A pedaling force measurement device according to a third aspect of the present invention is the pedaling force measurement device according to the second aspect, wherein the parameter detection part comprises a first strain sensor and a fourth strain sensor. The first strain sensor is configured to detect a first force component, corresponding to a rotational direction force component of the bending moment due to the load acting upon the crank arm from pedaling, as one of the parameters. The fourth strain sensor is configured to detect a fourth force component, corresponding to a shear force the load acting upon the crank arm, as one of the parameters to determine an axial direction load position from pedaling. In this case, the first force component, which constitutes a rotational direction force component of the crank arm, and the load position of the pedal being pushed by the user can be detected in addition to the second force component and the third force component. It is thus possible to detect the direction of the force applied during pedaling from a variety of angles.

A pedaling force measurement device according to a fourth aspect of the present invention is the pedaling force measurement device according to the third aspect, wherein each of the first through fourth strain sensors comprises at least two strain gauge elements forming a Wheatstone bridge circuit. It is thus possible to detect the first through the third force components and the load position using two strain gauge elements.

A pedaling force measurement device according to a fifth aspect of the present invention is the pedaling force measurement device according to the fourth aspect, wherein each of the first through fourth strain sensors comprises four strain gauge elements forming a Wheatstone bridge circuit. Temperature compensation of the strain gauge elements is thereby enabled, allowing for the suppression of variations in detection accuracy arising from temperature changes.

A pedaling force measurement device according to a sixth aspect of the present invention is the pedaling force measurement device according to the fifth aspect, wherein the strain-flexing part has a first surface, a second surface, a third surface and a fourth surface extending in a longitudinal direction of the crank arm. The first surface and the fourth surface are substantially perpendicular to the shaft of the pedal. The second surface and the third surface are substantially parallel to a shaft of the pedal. In this case, the provision of a strain gauge element on a surface substantially parallel with the shaft of the pedal allows the rotational direction first force component of the bending moment to be detected, and the provision of a strain gauge element on a surface substantially perpendicular to the pedal shaft allows the shear force moment, the pedal axial direction third force component of the bending moment, and the crank arm longitudinal direction second force component of the bending moment to be detected.

A pedaling force measurement device according to a seventh aspect of the present invention is the pedaling force measurement device according to the sixth aspect, wherein the strain-flexing part comprises a quadrangular prism. In this case, strain gauge elements can easily be applied to the surfaces of the quadrangular prism, allowing for improved productivity.

A pedaling force measurement device according to an eighth aspect of the present invention is the pedaling force measurement device according to the sixth or seventh aspect, wherein the four strain gauge elements forming the third strain sensor are disposed on one of the first and fourth surfaces of the strain-flexing part. The Wheatstone bridge circuit of the third strain sensor has a first pair of oppositely disposed strain gauge elements of the four strain gauge elements of the third strain sensor and a second pair of oppositely disposed strain gauge elements of the four strain gauge elements of the third strain sensor. The first pair of oppositely disposed strain gauge elements is spaced from the second pair of oppositely disposed strain gauge elements in the longitudinal direction of the crank arm. The first and second pairs of oppositely disposed strain gauge elements are symmetrically disposed with respect to a longitudinal neutral axis of the strain-flexing part.

In this case, the third force component is measured on the basis of the difference in bending moment between the position of the strain gauge elements disposed apart from each other in the longitudinal direction, and the third force component can be independently measured without interference from the first force component, second force component, or shear force.

A pedaling three measurement device according to a ninth aspect of the present invention is the pedaling force measurement device according to the sixth or seventh aspect, wherein the four strain gauge elements forming the third strain sensor are disposed on one of the first and fourth surfaces of the strain-flexing part. The Wheatstone bridge circuit of the third strain sensor has first, second, third and fourth strain gauge elements forming the four strain gauge elements of the third strain sensor. The first and third strain gauge elements are oppositely disposed from each other in the Wheatstone bridge circuit of the third strain sensor. The second and fourth strain gauge elements are disposed between the first and third strain gauge elements. The first and third strain gauge elements is symmetrically disposed with respect to a longitudinal neutral axis of the strain-flexing part and disposed at one end of the strain-flexing part. The second and fourth strain gauge elements is symmetrically disposed with respect to the longitudinal neutral axis of the strain-flexing part and disposed at the other end of the strain-flexing part.

In this case, the third force component can be measured on the basis of the difference in bending moment between the positions of the strain gauge elements disposed apart from each other in the longitudinal direction. The third force component can be independently measured without interference from the first force component, second three component, or shear force. Because the strain gauge elements of the third strain sensor are disposed on both ends of the strain-flexing part, the output of the sensor can be increased.

A pedaling force measurement device according to a tenth aspect of the present invention is the pedaling force measurement device according to one of the sixth through the ninth aspects, wherein the four strain gauge elements forming the first strain sensor are disposed on one end of the strain-flexing part. The Wheatstone bridge circuit of the first strain sensor has first, second, third and fourth strain gauge elements forming the four strain gauge elements of the first strain sensor. The first and third strain gauge elements are oppositely disposed from each other in the Wheatstone bridge circuit of the first strain sensor. The second and fourth strain gauge elements are disposed between the first and third strain gauge elements. The first and third strain gauge elements are disposed on one of the second and third surfaces, while the second and fourth strain gauge elements being disposed on the other of the second and third surfaces. The first and third strain gauge elements are symmetrically disposed with respect to a longitudinal neutral axis of the strain-flexing part. The second and fourth strain gauge elements are symmetrically disposed with respect to the longitudinal neutral axis of the strain-flexing part.

In this case, the first strain sensor is disposed on the other end of the strain-flexing part, where the first force component constituting the rotational direction force component of the bending moment of the crank arm is larger, allowing for the output of the strain gauge element to be increased.

A pedaling force measurement device according to an eleventh aspect of the present invention is the pedaling force measurement device according to one of the sixth through the ninth aspects, wherein the four strain gauge elements forming the first strain sensor are disposed on one end of the strain-flexing part. The Wheatstone bridge circuit of the first strain sensor has first, second, third and fourth strain gauge elements forming the four strain gauge elements of the first strain sensor. The first and third strain gauge elements are oppositely disposed from each other in the Wheatstone bridge circuit of the first strain sensor. The second and fourth strain gauge elements are disposed between the first and third strain gauge elements. The first and third strain gauge elements are disposed on one of the second and third surfaces, while the second and fourth strain gauge elements being disposed on the other of the second and third surfaces. The first and third strain gauge elements are aligned in the longitudinal direction of the strain-flexing part. The second and fourth strain gauge elements are aligned in the longitudinal direction of the strain-flexing part.

In this case, the first strain sensor is disposed on the other end of the strain-flexing part, where the first force component constituting the rotational direction force component of the bending moment of the crank arm is larger, allowing for the output of the strain gauge element to be increased.

A pedaling force measurement device according to a twelfth aspect of the present invention is the pedaling force measurement device according to one of the sixth through the eleventh aspects, wherein the four strain gauge elements forming the second strain sensor are disposed on one end of the strain-flexing part. The Wheatstone bridge circuit of the first strain sensor has first, second, third and fourth strain gauge elements forming the four strain gauge elements of the second strain sensor. The first and third strain gauge elements are oppositely disposed from each other in the Wheatstone bridge circuit of the second strain sensor. The second and fourth strain gauge elements are disposed between the first and third strain gauge elements. The first and third strain gauge elements are disposed on one of the first and fourth surfaces, while the second and fourth strain gauge elements being disposed on the other of the first and fourth surfaces. The first and third strain gauge elements are symmetrically disposed with respect to a longitudinal neutral axis of the strain-flexing part. The second and fourth strain gauge elements are symmetrically disposed with respect to the longitudinal neutral axis of the strain-flexing part.

In this case, the output of the second strain sensor, which detects the second force component constituting the longitudinal force component of the crank arm bending moment, is less subject to interference from the pedal axial direction force component of the bending moment of the load acting on the crank arm.

A pedaling force measurement device according to a thirteenth aspect of the present invention is the pedaling force measurement device according to one of the sixth through the twelfth aspects, wherein the four strain gauge elements forming the fourth strain sensor are disposed at a center area of the strain-flexing part with respect to the longitudinal direction of the strain-flexing part. The Wheatstone bridge circuit of the first strain sensor has first, second, third and fourth strain gauge elements forming the four strain gauge elements of the fourth strain sensor. The first and third strain gauge elements are oppositely disposed from each other in the Wheatstone bridge circuit of the fourth strain sensor, the second and fourth strain gauge elements being disposed between the first and third strain gauge elements. The first and second strain gauge elements are disposed on one of the first and fourth surfaces, while the third and fourth strain gauge elements being disposed on the other of the first and fourth surfaces. The first and second strain gauge elements are symmetrically disposed with respect to a longitudinal neutral axis of the strain-flexing part. The third and fourth strain gauge elements are symmetrically disposed with respect to the longitudinal neutral axis of the strain-flexing part.

In this case, interference from the first force component, the second force component, and the third force component is reduced, and the shear force of the shear moment of the load acting on the crank arm can be measured.

A pedaling force measurement device according to a fourteenth aspect of the present invention is the pedaling force measurement device according to one of the sixth through the twelfth aspects, wherein the four strain gauge elements forming the fourth strain sensor are disposed at a center of the strain-flexing part with respect to the longitudinal direction of the strain-flexing part. The Wheatstone bridge circuit of the first strain sensor has first, second, third and fourth strain gauge elements forming the four strain gauge elements of the fourth strain sensor. The first and third strain gauge elements are oppositely disposed from each other in the Wheatstone bridge circuit of the fourth strain sensor. The second and fourth strain gauge elements are disposed between the first and third strain gauge elements. The first, second, third and fourth strain gauge elements are disposed on one of the first and fourth surfaces. The first and second strain gauge elements are symmetrically disposed with respect to a longitudinal neutral axis of the strain-flexing part. The third and fourth strain gauge elements are symmetrically disposed with respect to the longitudinal neutral axis of the strain-flexing part.

In this case, interference from the first force component, the second force component, and the third force component is reduced, and the shear force of the shear moment of the load acting on the crank arm can be measured.

A pedaling force measurement device according to a fifteenth aspect of the present invention is the pedaling force measurement device according to one of the first through the fourteenth aspects, wherein the interference suppression part is formed at a location that is displaced from a central position in a longitudinal direction of the crank arm towards a pedal mounting end of the strain-flexing part, and an area of the location of the interference suppression part has a cross section orthogonal to the longitudinal direction that is different than elsewhere along the crank arm. In this case, simply varying cross-sectional area allows for the easy suppression of interference.

A pedaling force measurement device according to a sixteenth aspect of the present invention is the strain-flexing part according to the fifteenth aspect, wherein the interference suppression part includes a through-hole formed in the strain-flexing part. In this case, the interference suppression part is more easily formed.

A pedaling force measurement device according to a seventeenth aspect of the present invention is the pedaling force measurement device according to one of the second through the sixteenth aspects, wherein the interference suppression part is programmed to perform a computational process to suppress interference from the third force component outputted from the third strain sensor while detecting the second force component based on outputs of the second strain sensor. In this case, the computational process enables the interfering third force component contained within the second force component to be suppressed, allowing for accurate measurement of the second force component.

A pedaling force measurement device according to an eighteenth aspect of the present invention is the pedaling force measurement device according to one of the third through the seventeenth aspects, wherein the interference suppression part is programmed to perform a computational process to suppress interference from the third force component based on outputs of the first, second, third and fourth strain sensors. In this case, the computational process is performed on the basis of the output of the four strain sensors, allowing for even more precise suppression of interference.

A pedaling force measurement device according to a nineteenth aspect of the present invention is the pedaling force measurement device according to one of the first through the eighteenth aspects, wherein the strain-flexing part is provided separately from the crank arm. In this case, the strain-flexing part is provided separately from the crank arm, allowing for the provision of a strain-flexing part even on a crank arm having a complex shape. In addition, the same strain-flexing part can be used with crank arms of a variety of shapes, enabling standardization of the strain-flexing part. Moreover, the crank arm and the strain-flexing part can be manufactured separately, allowing for improved productivity and ease of maintenance.

A pedaling force measurement device according to a twentieth aspect of the present invention is the pedaling force measurement device according to one of the first through the eighteenth aspects, further provided with a crank arm.

A pedaling force measurement device according to a twenty-first aspect of the present invention is the pedaling force measurement device according to the twentieth aspect, wherein the crank arm comprises a pedal attachment part for attaching the pedal, a crankshaft attachment part for attaching the crankshaft and a crank length adjustment mechanism adjustably coupling the pedal attachment part to the crankshaft attachment part for altering relative positions of the pedal attachment part and the crankshaft attachment part in a longitudinal direction of the crank arm. In this case, the plurality of pedaling force parameters can be measured at altered relative positions for the pedal attachment part and the crank shaft attachment part, allowing a crank length optimal for a user to be obtained.

A pedaling force measurement device according to a twenty-second aspect of the present invention is the pedaling force measurement device according to the twenty-first aspect, wherein the strain-flexing part is attached to the pedal attachment part. In this case, there is no change in the relative positions of the pedal attachment position and the strain-flexing part, allowing for effects upon the output of the parameter detection part arising from changes in the relative positions of the pedal attachment part and the crank shaft attachment part to be suppressed.

A pedaling force measurement device according to a twenty-third aspect of the present invention is the pedaling force measurement device according to one of the first through the eighteenth aspects, wherein the strain-flexing part is integrally formed with the crank arm. In this case, there is no need to provide a separate strain-flexing part, simplifying the configuration of the pedaling force measurement device.

According to the present invention, it is possible to suppress interference in one parameter out of a plurality of pedaling force parameters acting upon a crank arm via a pedal being pushed from other parameters, and to suppress errors in the detected parameter. It is thus possible to precisely measure pedaling force parameters.

BRIEF DESCRIPTION OF THE DRAWINGS

Referring now to the attached drawings which form a part of this original disclosure:

FIG. 20 shows formulas for the items shown on the display screen shown in FIG. 13.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
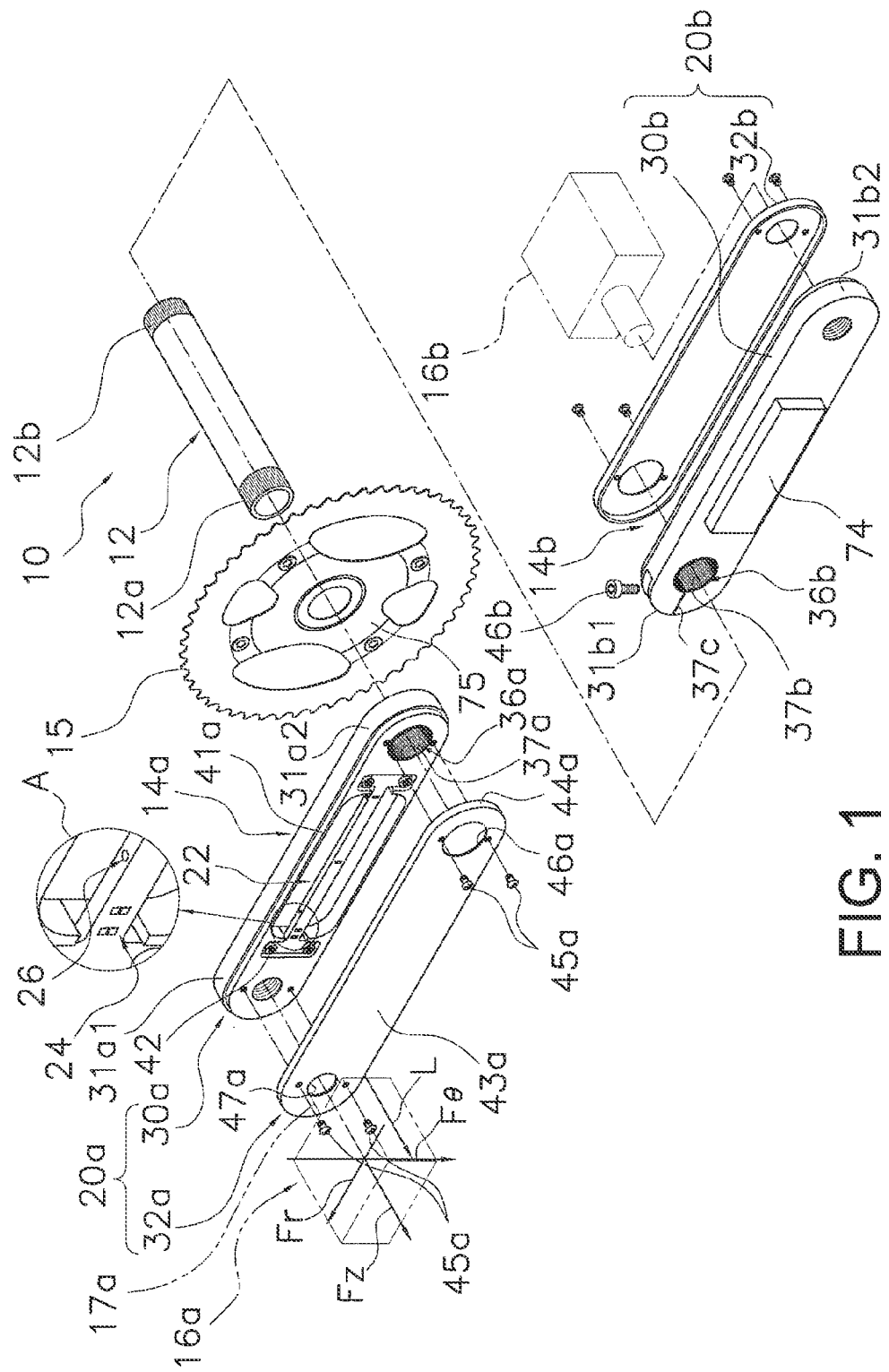
FIG. 1 is an exploded perspective view of a pedaling force measurement device according to a first embodiment of the present invention.

In FIG. 1, a crank assembly 10 according to a first embodiment of the present invention is provided with a crank shaft 12, a first pedaling force measurement device 14a, a second pedaling force measurement device 14b, and a sprocket 15. The crank shaft 12 has a first end 12a and a second end 12b. The first pedaling force measurement device 14a is coupled to the first end 12a of the crank shaft 12 so as to be capable of rotating integrally with the crank shaft 12. The second pedaling force measurement device 14b is coupled to the second end 12b of the crank shaft 12 so as to be capable of rotating integrally with the crank shaft 12. Here, the first end 12a of the crank shaft 12 is disposed to the right side of a bicycle as seen from behind when the crank assembly 10 is mounted on the bicycle, and the second end 12b is disposed to the left side. In the present embodiment, the crank shaft 12 is formed in a hollow cylindrical shape.

The first pedaling force measurement device 14a has a first crank arm 20a capable of being coupled to the first end 12a of the crank shaft 12 so as to be capable of rotating integrally with the crank shaft 12. A first pedal 16a can be attached to one end 31a1 in the longitudinal direction of the first crank arm 20a, and the first end 12a of the crank shaft 12 can be attached to another end 31a2 in the longitudinal direction. The first pedaling force measurement device 14a is a device for measuring a plurality of pedaling force parameters acting on the first crank arm 20a due to the first pedal 16a being pushed. The first pedaling force measurement device 14a is provided with a first crank arm 20a, a strain-flexing part 22, a parameter detection part 24, and a through-hole 26 serving as an interference suppression part 26. The strain-flexing part 22 is detachably provided on the first crank arm 20a, and strain acting on the first crank arm 20a is conveyed thereto. The parameter detection part 24 is disposed on the strain-flexing part 22, and detects a plurality of parameters on the basis of the strain being conveyed to the strain-flexing part 22. The interference suppression part 26 suppresses interference in one parameter detected by the parameter detection part 24 from the other parameters.

The sprocket 15 is anchored to the first crank arm 20a via a sprocket attachment part 75. The sprocket attachment part 75 is anchored to the first crank arm 20a by an anchoring member not shown in the drawings, such as a bolt. The sprocket attachment part 75 has an insertion hole into which the crank shaft 12 is inserted, and a plurality of radially extending arms. Anchoring parts, such as bolts, for anchoring the inner periphery of the sprocket 15 are provided on the arms, and the sprocket 15 is detachably anchored to the arms. The sprocket attachment part 75 may be press-fitted to the crank shaft 12, or may be formed integrally with the first crank arm 20a.

The second pedaling force measurement device 14b has a configuration similar to that of the first pedaling force measurement device 14a, and is a device for measuring a plurality of pedaling force parameters acting on a second crank arm 20b due to a second pedal 16b being pressed. The second pedaling force measurement device 14b has the second crank arm 20b, as well as a strain-flexing part 22, a parameter detection part 24, and an interference suppression part 26 configured similarly to those of the first pedaling force measurement device 14a, none of the latter three being shown in the drawings. In the following description, therefore, description of those features of the second pedaling force measurement device 14b similar to the first pedaling force measurement device 14a will be omitted, and features similar to those of the first pedaling force measurement device 14a will be labeled with similar reference numbers in FIG. 1, the features being distinguished by suffixed letters "a" and "b".

The first crank arm 20a and the second crank arm 20b are both rod-shaped members extending in the longitudinal direction. The two ends of the first crank arm 20a and the second crank arm 20b have rounded hemispherical shapes, but there is no particular limitation upon the shapes of the ends. The first crank arm 20a has a first arm body 30a and a first arm cover 32a covering the first arm body 30a. The second crank arm 20b has a second arm body 30b and a second arm cover 32b covering the second arm body 30b.

Figure 2:
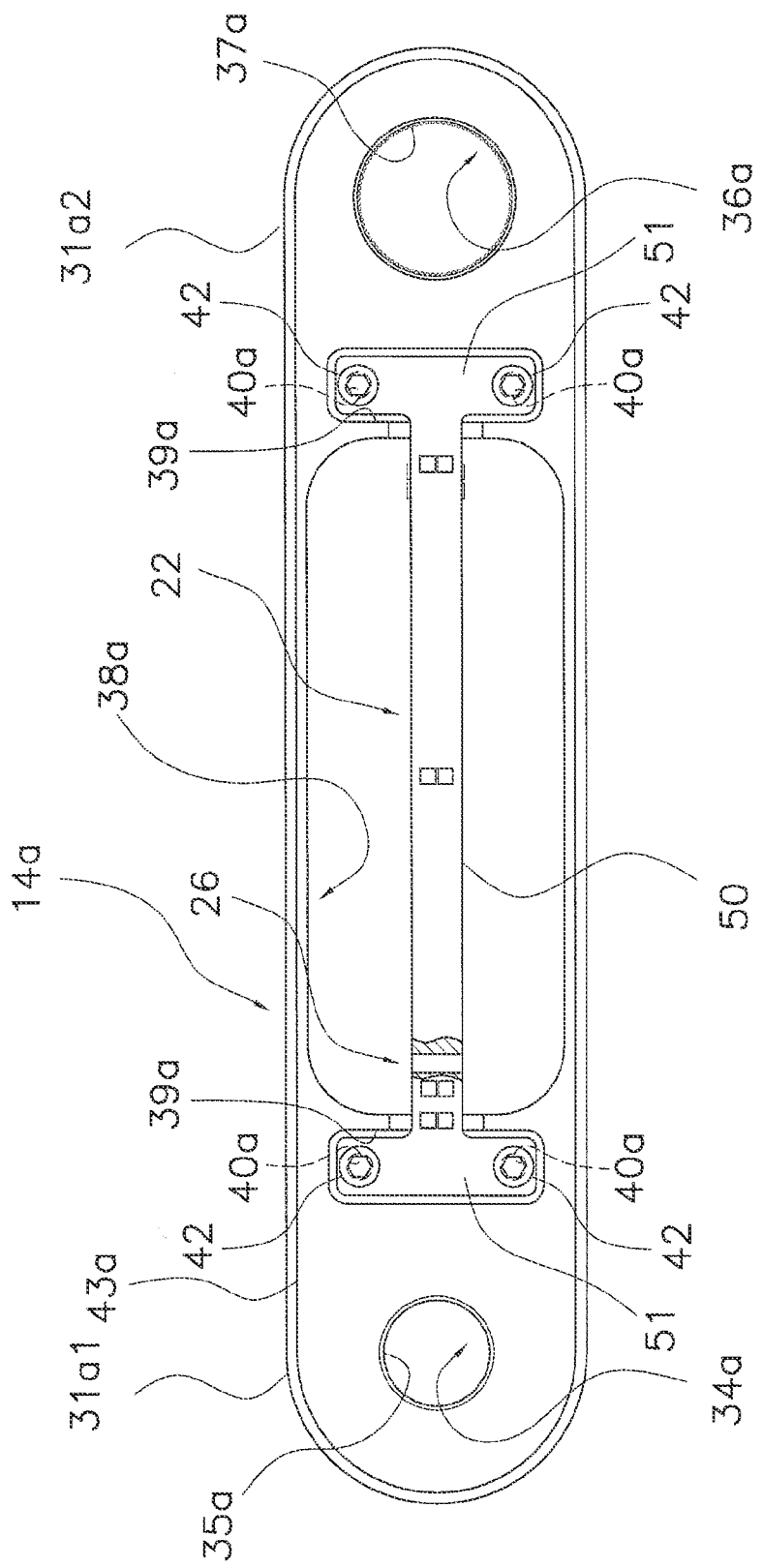
FIG. 2 is a front via of an arm body of a crank arm.

As shown in FIG. 2, the first arm body 30a has a first pedal attachment part 34a on the one end 31a1 in the longitudinal direction to which the first pedal 16a can be attached. The first arm body 30a has a first crank shaft attachment part 36a capable of being anchored first end 12a of the crank shaft 12 via suitable anchoring means, such as press fitting or bolts, on the other end 31a2 in the longitudinal direction. In the present embodiment, the first end 12a of the crank shaft 12 is anchored to the first crank shaft attachment part 36a by press fitting. A pedal shaft 17a of the first pedal 16a can be detachably anchored to the first pedal attachment part 34a. The first pedal attachment part 34a has, for example, a first screw hole 35a into which the pedal shaft 17a screws. The first crank shaft attachment part 36a has a first attachment hole 37a. Serrations are formed in the inner periphery facing the first attachment hole 37a of the first crank shaft attachment part 36a, and the first end 12a of the crank shaft 12 is press-fitted and anchored to the first attachment hole 37a. Here, the first attachment hole 37a is a through-hole, but the first attachment hole 37a can also be formed as an indentation.

The first arm body 30a also has a first housing part 38a in which a strain-flexing part 22a is housed between the first pedal attachment part 34a and the first crank shaft attachment part 36a. The first housing part 38a is formed as an indentation. In the present embodiment, the first housing part 38a opens away from a bicycle in the direction in which the crank shaft extends when the crank assembly 10 is attached to the bicycle. The first housing part 38a has first attachment parts 39a along both sides in the longitudinal direction of the first crank arm 20a for anchoring the strain-flexing part 22a to the first crank arm 20a. Two anchoring holes 40a into which anchoring bolts 42 for anchoring the strain-flexing part 22a are formed in each of the first attachment parts 39a. The anchoring holes 40a in the first attachment parts 39a are symmetrically disposed with respect to a plane containing the pedal shaft 17a and the crank shaft 12. In the present embodiment, the anchoring holes 40a are screw holes. An annular first difference in level 41a for mounting the first arm cover 32a is formed on the outer periphery of the first arm body 30a. The first difference in level 41a is formed as an indentation in the outside surface having a depth identical to the thickness of a first rim 44a of the first arm cover 32a to be described hereafter.

As shown in FIG. 1, the first arm cover 32.a has a first cover 43a for covering the first housing part 38a and a first rim 44a annularly projecting from the circumferential edge of the first cover 43a towards the first arm body 30a. The inner periphery of the first rim 44a mates with the first difference in level 41a in the first arm body 30a. The first cover 43a is provided from the one end 31a1 of the first crank arm 20a in the longitudinal direction to the other end 31a2 so as to entirely cover one side of the first arm body 30a. To this end, the first cover 43a has a first through-hole 47a, communicating with the first screw hole 35a, through which the pedal shaft 17a of the first pedal 16a can pass, and a second through-hole 46a communicating with the first attachment hole 37a. The second through-hole 46a is formed at a diameter similar to that of the first attachment hole 37a. Here, a second through-hole 46a is formed, but it is also acceptable not to form a second through-hole 46a. The first arm cover 32a is anchored to the first arm body 30a by a plurality (for example, 4) of screw members 45a. The anchoring method is not limited to screws; an anchoring method such as bonding or elastic engagement is also acceptable.

As shown in FIG. 1, the second crank arm 20b has a second arm body 30b and a second arm cover 32b covering the second arm body 30b. The second arm body 30b is configured differently from the first arm body 30a and a second crank shaft attachment part 36b. The second crank shaft attachment part 36b has a serrated second attachment hole 37b in which a slit 37c is formed. The slit 37c extends to the outer surface of the second arm body 30b. The width of the slit 37c is reduced by a tightening bolt 46b inserted from a direction intersecting the slit 37c. The second crank arm 20b is thereby anchored to the second end 12b of the crank shaft 12. Other features are identical to those of first crank arm 20a, and description thereof will therefore be omitted.

As shown in FIGS. 2, 3, 4, and 5, the strain-flexing part 22 has a strain-flexing part body 50 extending in the longitudinal direction of the first crank arm 20a, and anchor portions 51 at both ends of the strain-flexing part body 50 extending in a direction moving away from the strain-flexing part body 50 in a direction orthogonal to the strain-flexing part body 50. The strain-flexing part 22 has a flattened letter H shape. The strain-flexing part body 50 is formed as a quadrangular prism.

Figure 6:
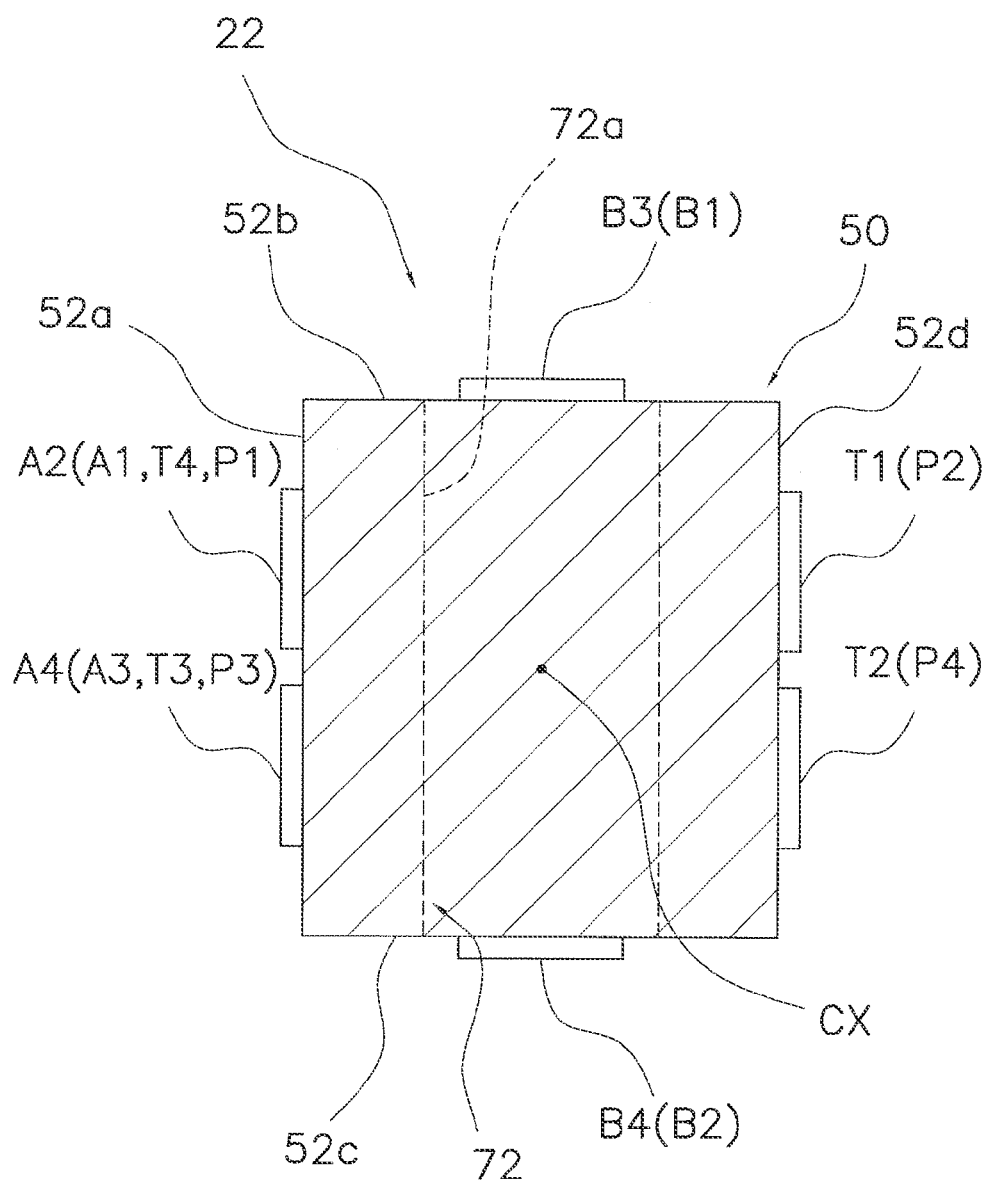
FIG. 6 is a cross-sectional view along line VI-VI in FIG. 5.

FIG. 6 shows a cross section of the strain-flexing part body 50. As shown in FIG. 6, the strain-flexing part body 50 has a first surface 52a, a second surface 52b, a third surface 52c, and a fourth surface 52d extending in the longitudinal direction of the first crank arm 20a. In the present embodiment, the first surface 52a, second surface 52b, third surface 52c, and fourth surface 52d of the strain-flexing part body 50 are all of the same size. The first surface 52a and the fourth surface 52d facing the first surface 52a are substantially perpendicular to the pedal shaft 17a of the first pedal 16a shown in FIG. 1. The second surface 52b and the third surface 5 facing the second surface 52b are substantially parallel with the pedal shaft 17a of the first pedal 16a shown in FIG. 1. The bend and shear of the strain-flexing part body 50 are detected by the parameter detection part 24, allowing the plurality of parameters to be measured.

Two anchoring holes 51a are formed in each of the anchor portions 51 separated from each other in a direction orthogonal to the lengthwise direction. The anchoring holes 51a are symmetrically provided on either side of the strain-flexing part body 50. The anchoring holes 51a are formed by through-holes, and extend in a direction substantially parallel to the shaft 17a of the pedal 16a. The anchoring bolts 42 for anchoring the strain-flexing part 22 in the first housing part 38a are screwed the anchoring holes 40a through the anchoring holes 51a.

The strain-flexing part body 50 is provided so that the first arm body 30a and the first arm cover 32a do not touch when the strain-flexing part 22 is anchored to the crank arm 20a.

Figure 3:
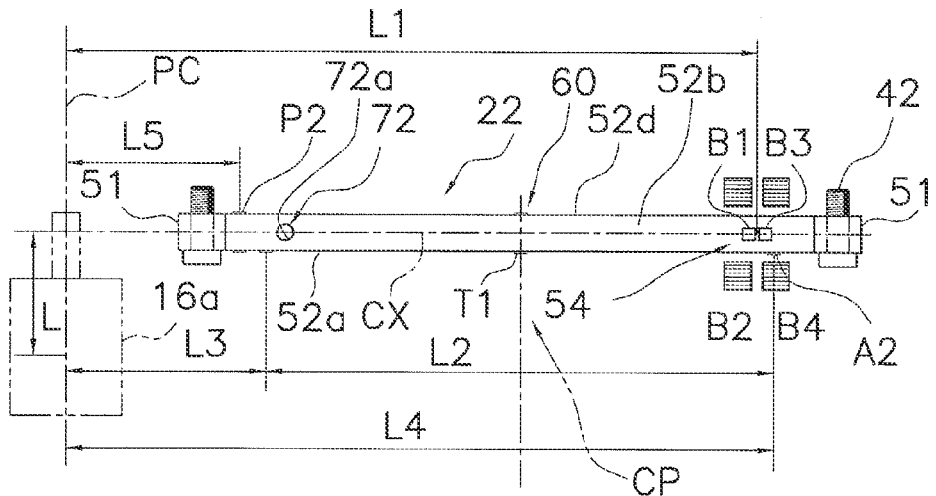
FIG. 3 is a plan view of a strain-flexing part.
Figure 4:
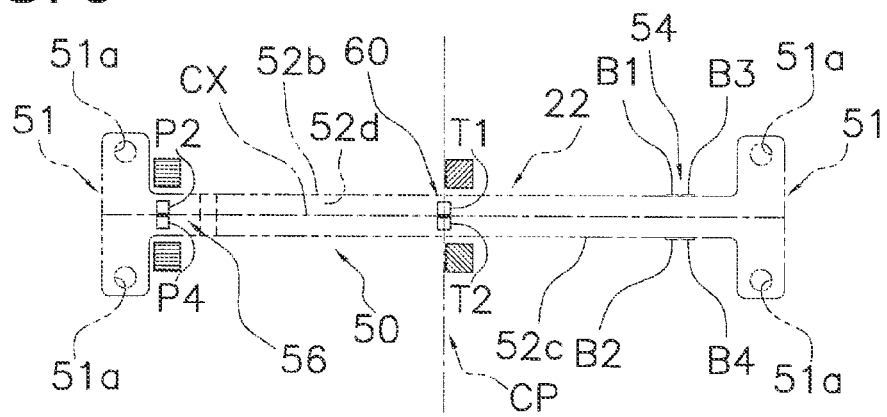
FIG. 4 is a view of the rear surface of a strain-flexing part as seen through the front surface.

As shown in FIGS. 2, 3, and 4, the parameter detection part 24 has a first strain sensor 54 for detecting a first force component Fθ, a second strain sensor 56 for detecting a second force component Fr, a third strain sensor for detecting a third force component Fz, and a fourth strain sensor 60 for detecting the shear force of the load acting on the first crank arm 20a in order to find a load position L.

As shown in FIG. 1, the first force component Fθ is a rotational direction force component of the bending moment of the load acting on the first crank arm 20a. The second force component Fr is a force component in the longitudinal direction of the first crank arm 20a for the bending moment of the load acting on the first crank arm 20a. The third force component Fz is a force component in the axial direction of the first pedal 16*a* for the bending moment of the load acting on the first crank arm 20*a*. The load position L is the position in the axial direction of the first pedal 16*a* where the user pushes the first pedal 16*a*, and the length in the axial direction from the outer surface of the first crank arm 20*a* to the position on the first pedal 16*a* acted on by the load.

The first strain sensor 54 has four strain gauge elements B1, B2, B3, and 94 forming a Wheatstone bridge circuit. The second strain sensor 56 has four strain gauge elements P1, P2, P3, and P4 forming a Wheatstone bridge circuit. The third strain sensor 58 has four strain gauge elements A1, A2, A3, and A4 forming a Wheatstone bridge circuit. The fourth strain sensor 60 has four strain gauge elements T1, T2, T3, and T4 forming a Wheatstone bridge circuit.

Figure 7:
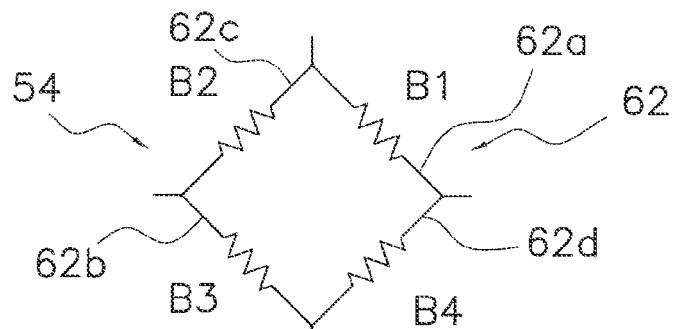
FIG. 7 is a circuit diagram showing the disposition of strain gauges in a Wheatstone bridge of a first strain sensor.

The four strain gauge elements B1, B2, B3, and B4 constituting the first strain sensor 54 are disposed on the other end (in FIG. 3, the right end) of the strain-flexing part 22. The strain gauge elements B1, B2, B3, and B4 are disposed on the other end of the strain-flexing part body 50 at positions not contacting the crank arm 20*a*. As shown in FIG. 7, the strain gauge element B1 disposed on a first side 62*a* of the four sides of the Wheatstone bridge circuit 62 in the first strain sensor 54 and the strain gauge element B3 disposed on a second side 62*b* facing the first side 62*a* are disposed on the second surface 52*b*. As shown in FIGS. 3 and 6, the strain gauge element B2 disposed on a third side 62*c* between the first side 62*a* and the second side 62*b* of the Wheatstone bridge circuit 62 and the strain gauge element B4 disposed on a fourth side 62*d* between the first side 62*a* and the second side 62*b* are disposed on the third surface 52*c*.

The two strain gauge elements B1 and B3 disposed on the second surface 52*b* are aligned in the longitudinal direction over a longitudinal neutral axis CX of the strain-flexing part 22. The two strain gauge elements B2 and B4 disposed on the third surface 52*c* are aligned in the longitudinal direction over the longitudinal neutral axis CX of the strain-flexing part 22. In other words, in the first strain sensor 54, two strain gauge elements disposed on the same surface are aligned in the longitudinal direction over the longitudinal neutral axis CX of the strain-flexing part 22. The directions in which the strain gauge elements B1, B2, B3, and B4 detect strain are disposed along the longitudinal direction of the crank arm 20*a*.

The strain gauge element B1 and the strain gauge element B2 are disposed at overlapping positions sandwiching the strain-flexing part body 50. The strain gauge elements B3 and the strain gauge element B4 are also disposed at overlapping positions sandwiching the strain-flexing part body 50.

Figure 18:
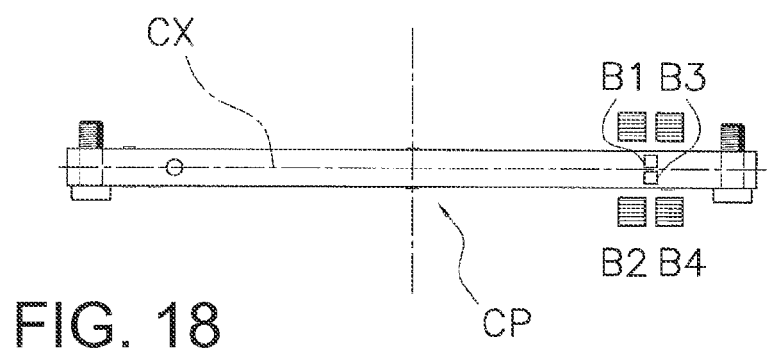
FIG. 18 is an illustration corresponding to FIG. 3 for a modified example of the disposition of the first strain sensor.

It is also acceptable thr the strain gauge element B1 and the strain gauge element B3 disposed on the second surface 52*b* to be symmetrically disposed with respect to the longitudinal neutral axis CX of the strain-flexing part 22, and the strain gauge element B2 and strain gauge element B4 disposed on the third surface 52*c* to be symmetrically disposed with respect to the longitudinal neutral axis CX of the strain-flexing part 22, as shown in FIG. 18. In other words, in the first strain sensor 54, two strain gauge elements disposed on the same surface may be symmetrically disposed with respect to the longitudinal neutral axis CX of the strain-flexing part 22. The strain gauge element B1 and the strain gauge element B2 are also disposed at overlapping positions sandwiching the strain-flexing part body 50. The strain gauge elements B3 and the strain gauge element B4 are also disposed at overlapping positions sandwiching the strain-flexing part body 50.

Figure 5:
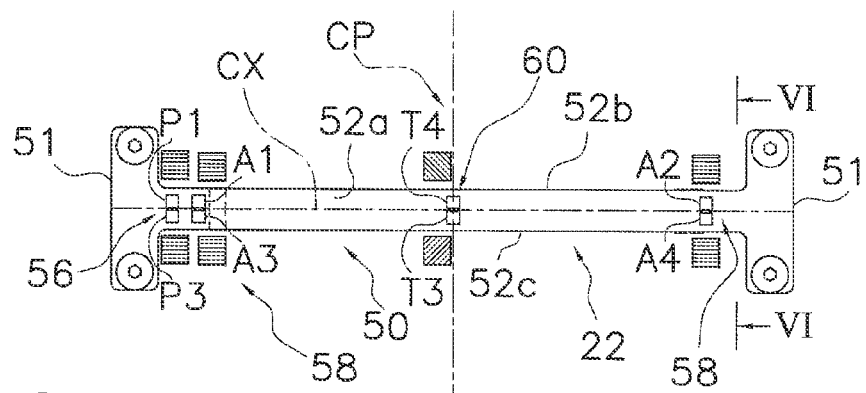
FIG. 5 is a front view of a strain-flexing part.
Figure 8:
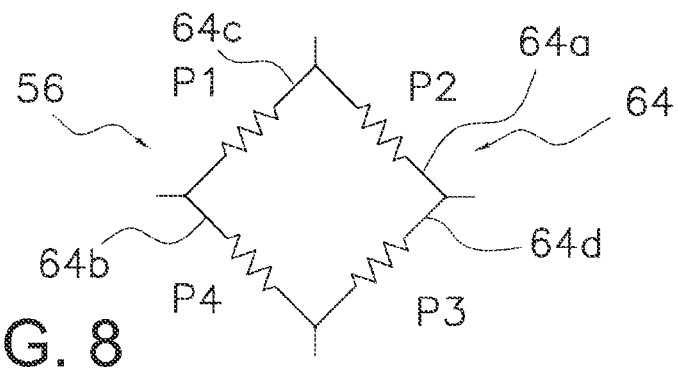
FIG. 8 is a circuit diagram showing the disposition of strain gauges in a Wheatstone bridge of a second strain sensor.

The four strain gauge elements P1, P2, P3, and P4 constituting the second strain sensor 56 are disposed on the one end (in FIG. 4, the left end) of the strain-flexing part 22. The strain gauge elements P1, P2, P3, and P4 are disposed on the one end of the strain-flexing part body 50 at positions not contacting the crank arm 20*a*. As shown in FIG. 8, the strain gauge element P2 disposed on a first side 64*a* of the four sides of the Wheatstone bridge circuit 64 in the second strain sensor 56 and the strain gauge element P4 disposed on a second side 64*b* facing the first side 64*a* are disposed on the fourth surface 52*d*. The strain gauge element P1 disposed on a third side 64*c* between the first side 64*a* and the second side 64*b* of the Wheatstone bridge circuit 64 and the strain gauge element P3 disposed on a fourth side 64*d* between the first side 64*a* and the second side 64*b* are disposed on the first surface 52*a*, as shown in FIGS. 4 and 5. The two strain gauge elements P1 and P3 disposed on the first surface 52*a* are symmetrically disposed with respect to the longitudinal neutral axis CX of the strain-flexing part 22. The two strain gauge elements P2 and P4 disposed on the fourth surface 52*d* are symmetrically disposed with respect to the longitudinal neutral axis CX of the strain-flexing part 22. In other words, in the second strain sensor 56, two strain gauge elements disposed on the same surface are symmetrically disposed with respect to the longitudinal neutral axis CX of the strain-flexing part 22. The directions in which the strain gauge elements P1, P2, P3, and P4 detect strain are disposed along the longitudinal direction of the crank arm 20*a*. The strain gauge element P1 and the strain gauge element P2 are disposed at overlapping positions sandwiching the strain-flexing part body 50. The strain gauge element P3 and the strain gauge element P4 are also disposed at overlapping positions sandwiching the strain-flexing part body 50.

Figure 9:
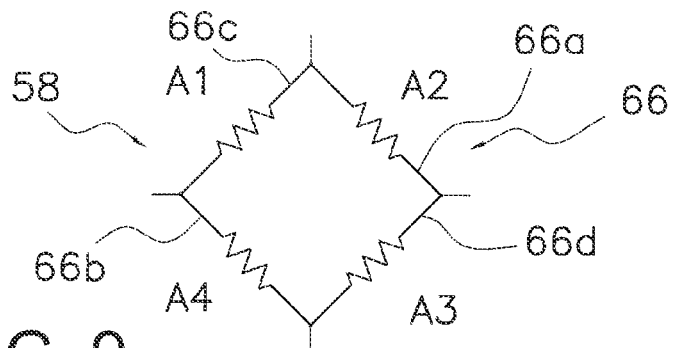
FIG. 9 is a circuit diagram showing the disposition of strain gauges in a Wheatstone bridge of a third strain sensor.

The four strain gauge elements A1, A2, A3, and A4 constituting the third strain sensor 58 are disposed on the first surface 52*a*. It is also acceptable for the third strain sensor 58 to be disposed on the fourth surface 52*d*. As shown in FIG. 9, the strain gauge element A2 disposed on a first side 66*a* of the four sides of the Wheatstone bridge circuit 66 constituting the third strain sensor 58 and the strain gauge element A4 disposed on a second side 66*b* facing the first side 66*a* are disposed on the other end (in FIG. 5, the right end) of the strain-flexing part 22, as shown in FIG. 5. The strain gauge elements A2 and A1 are disposed on the other end of the strain-flexing part body 50 at positions not contacting the crank arm 20*a*.

The strain gauge element A1 disposed on a third side 66*c* between the first side 66*a* and the second side 66*b* of the Wheatstone bridge circuit 66 and the strain gauge element A3 disposed on a fourth side 66*d* between the first side 66*a* and the second side 66*b* are disposed on the one end (in FIG. 5, the left end) of the strain-flexing part 22. The strain gauge elements A1 and A3 are disposed on the one end of the strain-flexing part body 50 at positions not contacting the crank arm 20*a*.

The two strain gauge elements A1 and A3 are symmetrically disposed with respect to the longitudinal neutral axis CX of the strain-flexing part 22 at the one end of the strain-flexing part 22. The two strain gauge elements A2 and A4 are symmetrically disposed with respect to the longitudinal neutral axis CX of the strain-flexing part 22 at the other end of the strain-flexing part 22. The directions in which the strain gauge elements A1, A2, A3, and A4 detect strain are disposed along the longitudinal direction of the crank arm 20*a*. The strain gauge element A1 and the strain gauge element A2 are disposed to one side of the longitudinal neutral axis CX of the strain-flexing part 22 in a direction orthogonal to the longitudinal direction of the crank arm 20*a*. The strain gauge element A3 and the strain gauge element A4 are disposed to the other side of the longitudinal neutral axis CX of the strain-flexing part 22 in the direction orthogonal to the longitudinal direction of the crank arm 20a.

Figure 10:
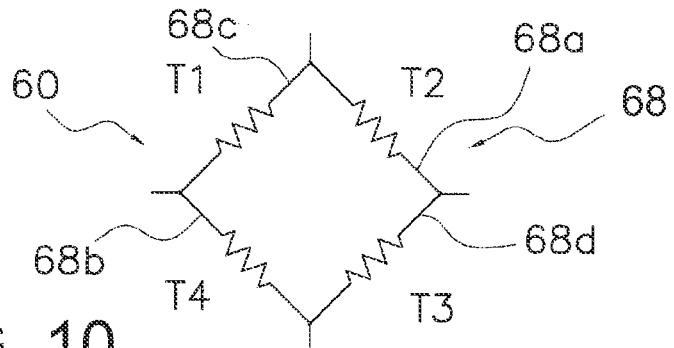
FIG. 10 is a circuit diagram showing the disposition of strain gauges in a Wheatstone bridge of a fourth strain sensor.

As shown in FIG. 4, the four strain gauge elements T1, T2, T3, and T4 constituting the fourth strain sensor 60 are disposed substantially at a central part CP in the longitudinal direction of the strain-flexing part 22. The central part CP encompasses the center and the vicinity of the center. The strain gauge elements T1 T2, T3, and T4 are disposed in the central part longitudinal direction of the strain-flexing part body 50. The strain gauge element T2 and the strain gauge element T1 disposed on an adjacent first side 68a and third side 68c of the four sides of the Wheatstone bridge circuit 68 in the fourth strain sensor 60, as shown in FIG. 10, are disposed on the fourth surface 52d, as shown in FIG. 4. As shown in FIG. 5, the strain gauge element T4 disposed on a second side 68b facing the first side 68a and the strain gauge element T3 disposed on a fourth side 68d facing the third side 68c are disposed on the first surface 52a.

The two strain gauge elements T3 and T4 disposed on the first surface 52a are symmetrically disposed with respect to the longitudinal neutral axis CX of the strain-flexing part 22. The two strain gauge elements T1 and T2 disposed on the fourth surface 52d are also symmetrically disposed with respect to the longitudinal neutral axis CX of the strain-flexing part 22. In other words, in the fourth strain sensor 60, two strain gauge elements disposed on the same surface are symmetrically disposed with respect to the longitudinal neutral axis CX of the strain-flexing part 22.

The strain gauge element T1 is disposed so that the direction in which it detects strain is tilted 45° with respect to the longitudinal direction of the crank arm 20a. The strain gauge element T2 is disposed so that the direction in which it detects strain is tilted 45° with respect to the longitudinal direction of the crank arm 20a and orthogonal to the direction in which the strain gauge element T1 detects strain.

The strain gauge element T3 is disposed so that the direction in which it detects strain is tilted 45° with respect to the longitudinal direction of the crank arm 20a and substantially parallel to the direction in which the strain gauge element T2 detects strain. The strain gauge element T4 is disposed so that the direction in which it detects strain is tilted 45° with respect to the longitudinal direction of the crank arm 20a, orthogonal to the direction in which the strain gauge element T2 detects stress, and substantially parallel to the direction in which the strain gauge element detects strain.

The strain gauge element T1 and the strain gauge element T4 are disposed at overlapping positions sandwiching the strain-flexing part body 50. The strain gauge element T2 and the strain gauge element T3 are also disposed at overlapping positions sandwiching the strain-flexing part body 50.

Figure 19:
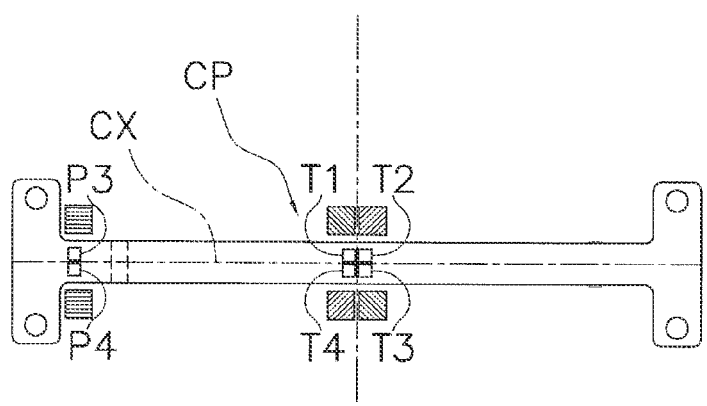
FIG. 19 is an illustration corresponding to FIG. 4 for a modified example of the disposition of the fourth strain sensor.

The strain gauge elements T1, T2, T3, and T4 of the fourth strain sensor 60 may also be all disposed on the first surface 52a or the fourth surface 52d, as shown in FIG. 19. The strain gauge element T2 disposed on a first side 68a of the Wheatstone bridge circuit 68 and the strain gauge element T1 disposed on a third side 68c, and the strain gauge element T4 disposed on a second side 68b and the strain gauge element T3 disposed on a fourth side 68d, are symmetrically disposed with respect to the longitudinal neutral axis CX of the strain-flexing part 22. The strain gauge element T1 and the strain gauge element T2 are symmetrically disposed on either side of the center of the longitudinal direction of the strain-flexing part 22, and the strain gauge element T3 and the strain gauge element T4 are disposed symmetrically on either side of the longitudinal direction of the strain-flexing part 22.

Figure 11:
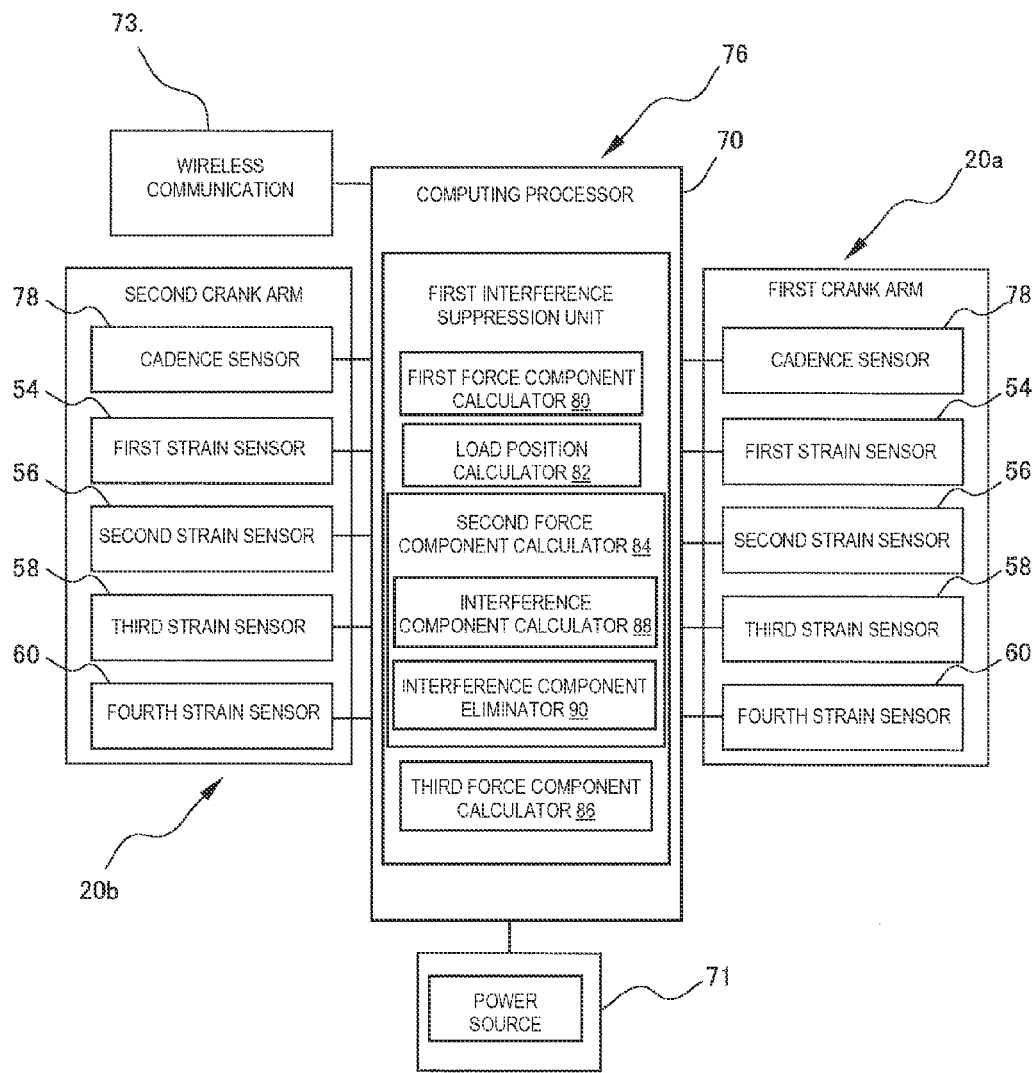
FIG. 11 is a block diagram of the configuration of control system for a pedaling force measurement device.

The interference suppression part 26 suppresses interference from, for example, a third force component Fz within the second force component Fr detected by the second strain sensor 56. The interference suppression part 26 has a first interference suppression part 70, as shown in FIG. 11, for suppressing interference via a computational process, and a second interference suppression part 72, as shown in FIG. 3, for suppressing interference via the structure of the strain-flexing part 22.

The first interference suppression part 70 is realized by a computing processor 76 including a microcomputer executing software. The computing processor 76 may be contained within an indentation or other containment space formed in the first crank arm 20a and the second crank arm 20b, or may be housed in a case member 74 optionally provided on a side surface of the second crank arm 20b, as shown in FIG. 1. In the present embodiment, the computing processor 76 is provided within a case member 74.

The computing processor 76 is connected to the first strain sensor 54, second strain sensor 56, third strain sensor 58, and fourth strain sensor 60 provided on the first crank arm 20a and the second crank arm 20b. The computing processor 76 and the strain sensors 54, 56, 58, and 60 are electrically connected by a line such as an electrical cable, printed wiring, or the like. The computing processor 76 and the strain sensors 54, 56, 58, and 60 may also be connected over a signal-amplifying relay circuit. In the present embodiment, the computing processor 76 is provided within the case member 74; thus a wire for connecting the strain sensors 54, 56, 58, and 60 of the first crank arm 20a and the computing processor 76 is provided on the crank shaft 12. Holes (not illustrated) through which wires can be passed are provided, as appropriate, in the first crank arm 20a, the second crank arm 20b, and the crank shaft 12.

The computing processor 76 is provided on the first crank arm 20a, and a cadence sensor 78 for measuring the rotational speed of the first crank arm 20a is connected thereto. The cadence sensor 78 may also be provided on an arm of the sprocket attachment part 75. The cadence sensor 78 is manifested by, for example, a lead switch. The computing processor 76 is further connected to a cadence sensor 78, provided on the second crank arm 20b, for measuring the rotational speed of the second crank arm 20b, a power source 71 constituted by a battery, and a wireless communication unit 73 capable of transmitting computed data to an external device, such as a personal computer. The power source 71 is provided on one of an indentation or other containment space formed in the first crank arm 20a or the second crank arm 20b, the crank shaft 12, or the case member 74. The cadence sensor 78 is faceably disposed with respect to at least one magnet provided on the frame of the bicycle on the periphery of the crank shaft 12.

The wireless communication unit 73 is provided in the case member 74. The case member 74 is formed from a synthetic resin that does not block radio waves. The case member 74 is detachably or undetachably anchored to the second crank arm 20b using anchoring means such as a bolt, an adhesive, or a band. The case member 74 is preferably attached to a side surface of the second crank arm 20b facing the bicycle frame when the crank assembly 10 is attached to a bicycle.

The first interference suppression part 70 has a first force component calculator 80, a load position calculator 82, a second force component calculator 84, and a third force component calculator 86 as software-manifested functional features. The second force component calculator 84 has an interference component calculator 88 and an interference component eliminator 90.

The output OP1 (Fθ) of the first strain sensor 54 corresponds to the bending moment M (Fθ) in the rotational direction of the first crank arm 20a. Thus, as shown in FIG. 3, the bending moment M (Fθ) of the first strain sensor 54 is the product of the first force component Fθ and a distance L1 (Fθ×L1). Here, the distance L1 is the distance between a central position of the longitudinal direction of the four strain gauge elements B1-B4 of the first strain sensor 54 and the axial center of the first pedal 16a. Thus, the first three component calculator 80 divides the bending moment M (Fθ) of the first strain sensor 54 by the distance L1 to calculate the first force component Fθ. That is, Fθ=OP1=M(Fθ)/L1.

The output OP4 (=L) of the fourth strain sensor 60 corresponds to the torque T(Fθ) of the first force component Fθ of the load position L; thus, as shown in FIG. 3, the torque T(Fθ) is the product of the first force component Fθ and the load position L (Fθ×L). Thus, the load position calculator 82 divides the output OP4 of the fourth strain sensor 60 by the first force component Fθ to calculate the load position L. That is, L=OP4=T(Fθ)/Fθ.

The output OP2 (Fr') of the second strain sensor 56 corresponds to the Fr bending moment M (Fr') of the load position L. The output OP2 (Fr') can be found by dividing the bending moment M (Fr') of the second strain sensor by the load position L. That is, Fr=OP2=M(Fr')/L.

The output OP3 (Fz) of the third strain sensor 58 corresponds to the bending moment M(Fz) of the first crank arm 20a. The bending moment M(Fz) of the third strain sensor 58 is a product of the third force component Fz and a distance L2 obtained by subtracting a distance L3 from the strain gauge elements A1, A3 on the one end to the axial center of the first pedal 16a from a distance L4 from the gauge elements A2, A4 on the other end as shown in FIG. 3 to the axial center of the first pedal 16a. Thus, the third force component calculator 86 divides by the output OP3 bending moment M(Fz) of the third strain sensor 58 to calculate the third force component Fz. That is, Fz=OP3=M(Fz)/L2.

In the second force component calculator 84, the interference component calculator 88 calculates the Fz interference component of the third force component upon the output OP2 of the second strain sensor 56. The interference component IF of the third force component Fz upon the second strain sensor 56 is the moment of a distance L5 from the second strain sensor 56 of the third force component Fz to the axial center of the first pedal 16a. Thus, the interference component calculator 88 calculates Fz×L5, the product of the calculated third force component Fz and the distance L5. That is, IF=Fz×L5.

The interference component eliminator 90 of the second force component calculator 84 eliminates the interference component IF of the third force component Fz in the bending moment M(Fr') of the second strain sensor 56. Specifically, the interference component Fz×L5 constituting the product of the third force component Fz calculated by the third force component calculator 86 and the distance L5 is subtracted from the output OP2 of the second strain sensor 56 to find the moment M(Fr) of the true second force component Fr, and this moment is divided by the load position L to calculate the true second force component Fr. That is, Fr=(M(Fr')−IF)/L. It is thereby possible to suppress interference from the third force component Fz.

The relationship between the outputs of the various sensors, the various first force components, and the load position can be experimentally determined in advance. Thus, the outputs of the sensors are treated as the force components and the load position in the foregoing description.

The second interference suppression part 72 suppresses interference from the second force component Fr upon the output OP3 of the second strain sensor 56 via the structure of the strain-flexing part 22. As shown in FIG. 3, the second interference suppression part 72 is formed displaced from a central position in the longitudinal direction of the first crank arm 20a toward the one end of the strain-flexing part 22, that is, toward the pedal attachment part 34a. The second interference suppression part 72 is formed in the strain-flexing part body 50. The area of a cross section orthogonal to the longitudinal direction of the second interference suppression part 72 differs from that in other parts of the strain-flexing part body 50, and, in the present embodiment, the area of the cross section differs from that in other parts of the strain-flexing part body 50. In the first embodiment, the second interference suppression part 72 is constituted by forming a through-hole 72a. As shown in FIG. 6, the through-hole 72a is formed penetrating the second surface 52b and the third surface 52c. The second interference suppression part 72 is disposed near the second strain sensor 56. The cross section of the through-hole 72a perpendicular to the direction in which the hole extends may be perfectly round, elongated, ellipsoidal, or polygonal.

In the present embodiment, the interference component IF within the second force component Fr is suppressed by the first interference suppression part 70 and the second interference suppression part 72, allowing for precise measurement of the second force component Fr. When, for example, a load was placed on the first crank arm 20a in a simulation, interference was −165% when no interference suppression part 26 was provided, but was reduced to −2.3% when an interference suppression part 26 was provided. Here, interference is a percentage obtained by dividing the second force component (Fr) measured from the output of the third strain sensor 58 when a predetermined load acts in the tension direction of the first crank arm 20a and the output of the third strain sensor 58 when a predetermined load acts in the axial direction of the pedal shaft by the measured third force component (Fz).

Figure 12:
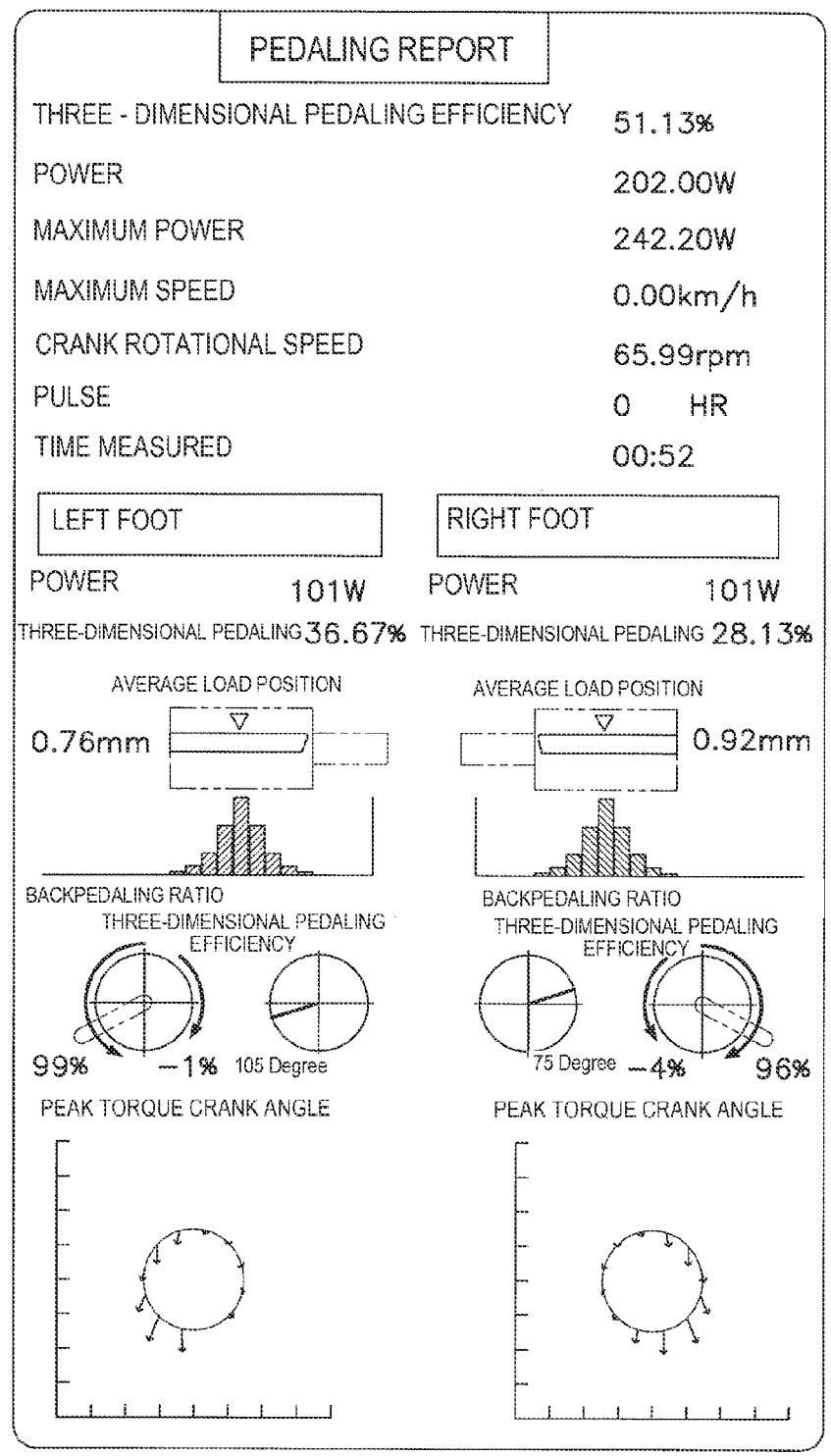
FIG. 12 is an illustration of an example of a display of pedaling force parameters measured by a pedaling force measurement device.

The measured results are transmitted to an external device by the wireless communication unit 73. FIG. 12 shows an example of the various force component load positions and the crank rotational speed being displayed on the external device.

In FIG. 12, when a bicycle to which the crank assembly 10 provided with the first pedaling force measurement device 14a and the second pedaling force measurement device 14b is mounted is driven, or a rotational load device for applying a rotational load to the rotation of the rear wheel of the bicycle is set and the bicycle is pedaled, the following display is shown based on the measured three force components, the load position, the crank rotational speed, and the like.

Results 1. three-dimensional pedaling efficiency, 2. power, 3. maximum power, 4. maximum speed, 5. crank rotational speed, 6. pulse, and 7. measurement time are shown in order from the top of the display screen. Numerical values for 8. power and 9. three-dimensional pedaling efficiency are shown therebelow for the left and right feet. Below that, graphs for 10. average load position, 11. average load position deviation, 12. backpedaling efficiency, 13. peak torque crank angle, and 14. average pedaling pattern are shown. Users can thereby learn the pedaling methods that are optimal for the, or select an optimal crank length.

1. Three-dimensional pedaling efficiency D, 9. Left crank three-dimensional pedaling efficiency DL, and right crank three-dimensional pedaling efficiency DR are calculated, for example, according to the formula shown in FIG. 20. Percentages obtained by multiplying the calculated values by 100 are displayed on the screen.

2. Power and 8. Left crank power and right crank power are found by multiplying the rotational torque and the number of rotations of the crank arm. The rotational torque of the crank arm is found using the first force component Fθ and the length of the crank arm. Information regarding the length of the crank arm may be stored in the computing processor, or may be set in the external device. The number of rotations is a value obtained from the cadence sensor 78. The product of the left crank power and the right crank power is displayed as power.

3. Maximum power is the value for power when it reaches maximum.

4. Maximum speed is the value for speed when it reaches maximum. For speed, information may be obtained from a typical speedometer provided on the bicycle, or the computing processor 76 may calculate speed on the basis of the cadence, gear ratio, and tire diameter. In this case, gear ratio information is received by the wireless communication unit 73, tire diameter information is set in advance.

5. Crank rotational speed is calculated on the basis of the cadence sensor 78.

6. Pulse is information transmitted by wireless or other means from a heart rate sensor when the rider is wearing a heart rate sensor.

7. Measurement time is the length of time for which measurement was performed. Instructions to begin and end measurement are given, for example, by the external device.

10. Average load position is the average value for the load position L measured at constant intervals during the measurement time. The average load position is displayed along with a graphic representing the pedal, as a triangle (∇) layered over the graphic representing the pedal. A scatter plot for load position is displayed beneath the graphic showing the average load position. A range of motion bar showing the range of the motion of the load position is also displayed over the graphic representing the pedal.

11. Average load position deviation is the average load position deviation from a central position of the pedal. The central position of the pedal is preset in the external device.

12. Backpedaling efficiency is displayed along with a graphic representing the crank arm, and indicates the proportions of force being applied in the forward rotational direction and the reverse rotational direction of the crank arm. For example, in FIG. 12, the proportion of force being applied in the forward rotational direction of the right crank arm is 96%, and the proportion of force being applied in the reverse rotational direction is 4%.

13. Peak torque crank angle indicates the crank angle is torque is at maximum. The crank angle when torque is at maximum is calculated on the basis of information from the cadence sensor.

14. Average pedaling pattern is a composite vector Fθ and Fr.

Second Embodiment

In the first embodiment, the present invention was described using an example of a crank arm having a constant crank length, but, in a second embodiment, the present invention will be described using an example of a crank arm having a variable crank length.

Figure 13:
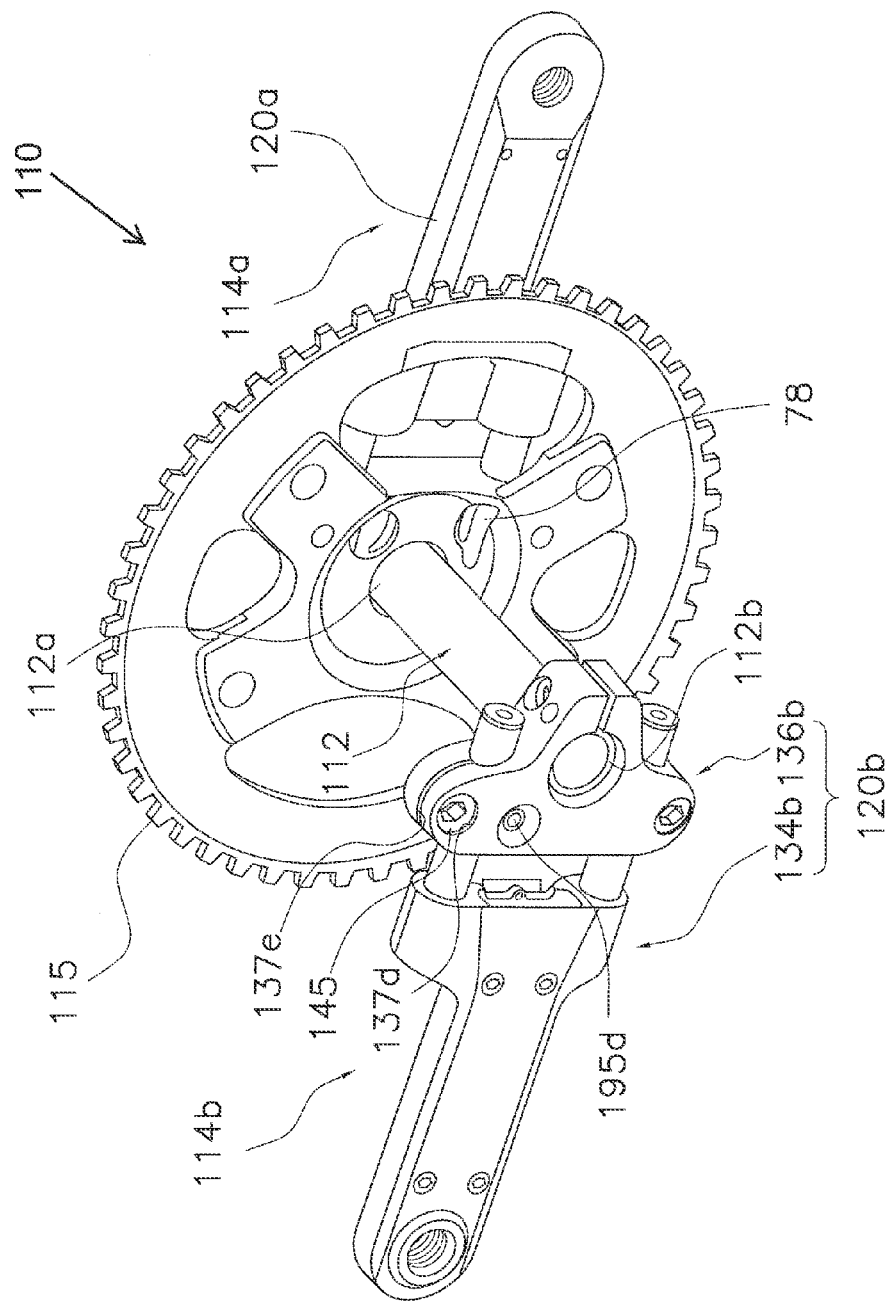
FIG. 13 is a perspective view including a pedaling force measurement device according to a second embodiment.

As shown in FIG. 13, a second pedaling force measurement device 114a is provided toward the front side of the drawing in the second embodiment.

A crank assembly 110 used in the second embodiment of the present invention is provided with a crank shaft 112, configured similarly to that of the first embodiment, having a first end 112a and a second end 112b, a first pedaling force measurement device 114a, a second pedaling force measurement device 114b, and a sprocket 115. A cadence sensor 78 is provided on a surface of a first crank arm 120a upon which the sprocket 115 is provided facing a second crank arm 120b. A cadence sensor 78 is similarly provided on a surface of the second crank arm 120b facing the first crank arm 120a. The first pedaling force measurement device 114a is coupled to the first end 112a of the crank shaft 112 so as to be capable of rotating integrally with the crank shaft 112. The second pedaling force measurement device 114b is coupled to the second end 112b of the crank shaft 112 so as to be capable of rotating integrally with the crank shaft 112. Here, the first end 112a of the crank shaft 112 is disposed to the right side of a bicycle as seen from behind when the crank assembly 110 is mounted on the bicycle, and the second end 112b is disposed to the left side.

The first pedaling force measurement device 114a has a first crank arm 120a, a strain-flexing part, a parameter detection part, and an interference suppression part. The second pedaling three measurement device 114b has a second crank arm 120b, a strain-flexing part, a parameter detection part, and an interference suppression part. The configurations of the strain-flexing part, parameter detection part, and interference suppression part are similar to those of the first embodiment, and description thereof will therefore be omitted. The following description will described the second crank arm 120b of the second pedaling force measurement device 114b, and those parts of the first crank arm 120a differing from the second crank arm 120b.

Figure 14:
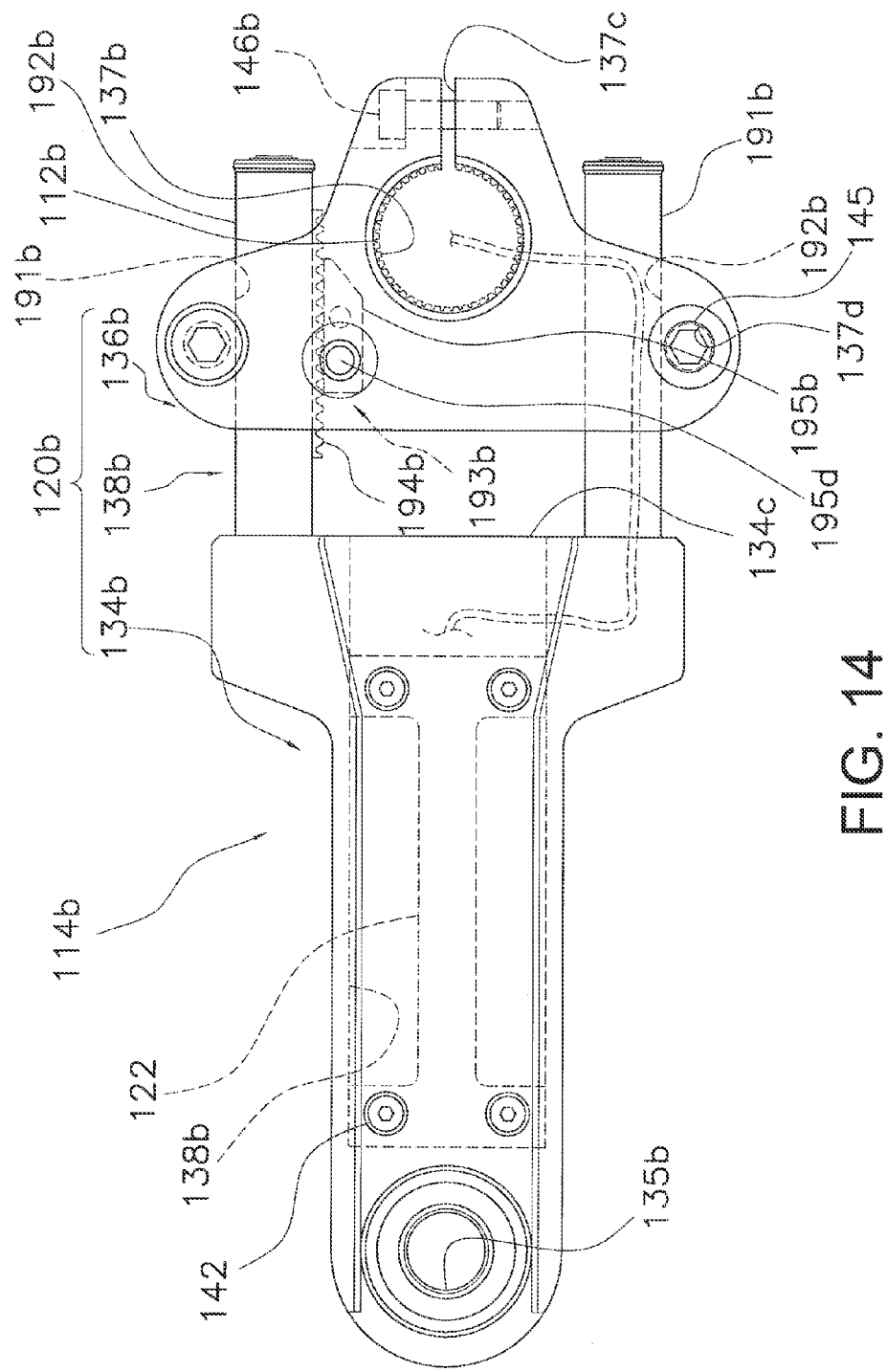
FIG. 14 is a plan view of a crank arm.

The second crank arm 120b, which is disposed toward the front of the drawing in FIG. 13, is provided with a second pedal attachment part 134b, a second crank shaft attachment part 136b, and a second crank length adjustment mechanism 138b, as shown in FIG. 14.

The second pedal attachment part 134b has a pedal attachment hole 135b in which a female screw part for attaching the second pedal is formed. A housing indentation 138b in which the strain-flexing part 122 can be housed is formed in the interior of the second pedal attachment part 134b. The housing indentation 138b is formed as a rectangular indentation in the other end surface 134c of the second pedal attachment part 134b. The housing indentation 138b is closed off by a cap member, not shown in the drawing, mounted on the other end surface 134c. The strain-flexing part 122 is anchored to a twenty-first housing indentation 138b by four anchoring bolts 142.

A case member similar to that of the first embodiment is provided on the second pedal attachment part 134b, and a computing processor 76 and a wireless communication unit are contained within the case member. As in the previous embodiment, the computing processor 76, the first crank arm 120a, the second crank arm 120b, and the various strain sensors are connected by a line such as an electrical cable, printed wiring, or the like. A space for internally disposing the line is provided in the second crank shaft attachment part 136b; in the present embodiment, the cadence sensor 78 is also provided in this space.

A space for internally disposing the line is provided in the second crank shaft attachment part 136b. A space for internally disposing the line is also provided in one second guide shaft 191b. A hole connecting the hollow space within the crank shaft and the space provided inside the second crank shaft attachment part 136b is formed at the part where the second crank shaft attachment part 136b and the crank shaft 112 contact. A hole connecting the space provided inside in the second crank shaft attachment part 136b and the space provided in the one second guide shaft 191b is also formed at the part where the second crank shaft attachment part 136b and the second guide shaft 191b contact. A hole connecting the space funned in the one second guide shaft 191*b* and the housing hole formed by the housing indentation 138 is further formed at the part where the second guide shaft 191*b* and the second pedal attachment part 134*b* contact.

The line passing through the hollow part of the crank shaft 112 is drawn around the second pedal attachment part 134*b* through the space formed in the second crank shaft attachment part 136*b* of the second crank arm 120*b* and one of the spaces formed in the interior of the second guide shaft 191*b*. The first crank arm 120*a* is similarly configured; thus, description thereof will be omitted.

The second crank shaft attachment part 136*l*) has a serrated second attachment hole 137*b* in which a slit 137*c* is formed. A first slit 137*c* extends in a radial direction from the second attachment hole 137*b* to the outer surface of the second crank shaft attachment part 136*b*. The width of the first slit 137*c* is reduced by a tightening bolt 146*b* inserted from a direction intersecting the first slit 137*c*. The second crank arm 120*b* is thereby anchored to the second end 112*b* of the crank shaft 112. A second hole 137*d* for anchoring a first crank shaft attachment part 136*b* in the longitudinal direction formed on both ends in a direction orthogonal to the longitudinal direction in the second crank shaft attachment part 136*b*. A second slit 137*e* (see FIG. 13) is formed at the part formed by the second hole 137*d*. A bolt member 145 for anchoring the second crank shaft attachment part 136*b* screws into the second hole 137*d*.

The second crank length adjustment mechanism 138*b* is a mechanism capable of altering the relative positions of the second pedal attachment part 134*b* and the second crank shaft attachment part 136*b* in the lengthwise direction of the second crank arm 120*b*. The second crank length adjustment mechanism 138*b* has a pair of second guide shafts 191*b*, a pair of second guide holes 192*b*, and a second positioning mechanism 193*b*.

The pair of second guide shafts 191*b* are provided on the other end surface of the second pedal attachment part 134*b* separated from each other in a direction orthogonal to the lengthwise direction, and are anchored to the other end surface via, for example, press-fitting. The pair of second guide holes 192*b* are provided in the second crank shaft attachment part 136*b*, thereby guiding the second crank shaft attachment part 136*b* to the second guide shaft 191*b*.

Figure 15:
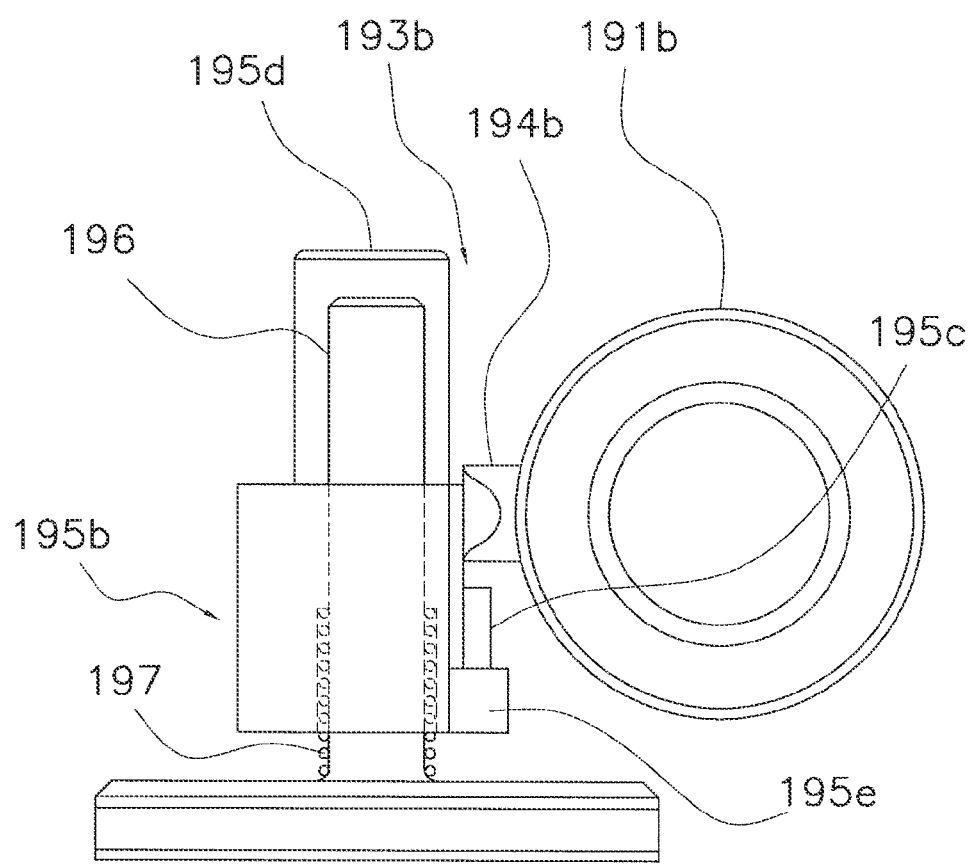
FIG. 15 is a cross-sectional view showing the configuration of a crank length adjustment mechanism for a crank arm.
Figure 16:
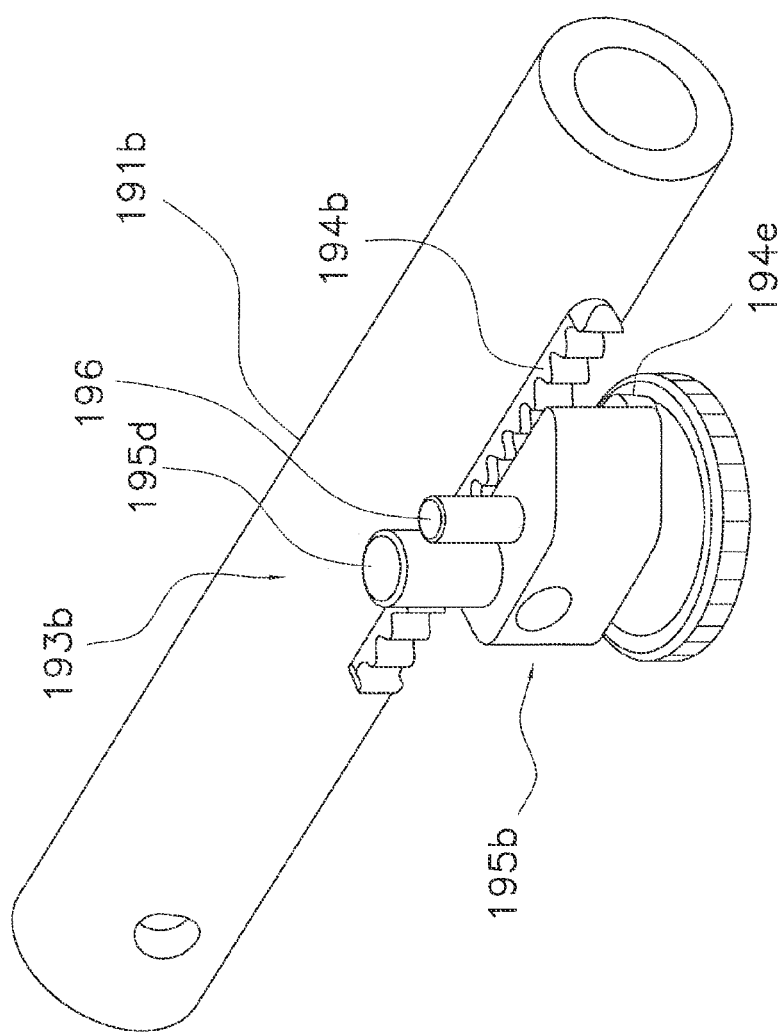
FIG. 16 is a perspective view showing the configuration of a crank length adjustment mechanism.

The second positioning mechanism 193*b* has a rack 194*b* anchored to one of the pair of second guide shafts 191*b* and a claw member 195*b* engaging with the rack 194*b*. As shown in FIGS. 15 and 16, the rack 194*b* is disposed extending in the lengthwise direction, and is anchored to the outer surface of the second guide shaft 191*b*. The engagement pitch of the rack 194*b* and the claw member 195*b* is preferably set to 2.5 mm. The adjustable range for the total length of the crank arm is set, for example, to from 155 tarn to 180 mm.

The claw member 195*b* has a claw 195*c* for engaging with the rack 194*b* and a compression operation part 195*d* exposed on the outer surface of the crank shaft attachment part 136*b*. The claw member 195*b* is capable of moving to an engagement position, shown in FIG. 16, at which the claw 195*c* engages with the rack 194*b*, and a release position, shown in FIG. 15, at which the engagement with the rack 194*b* is released via a compressive operation by the compression operation part 195*d*. The claw member 195*b* is guided to the engagement position and the release position by a guide member 196 provided on the second crank shaft attachment part 136*b*. As shown in FIG. 15, the claw member 195*b* is biased toward the engagement position by a biasing member 197 in the form of, for example, a coil spring. A positioning projection 195*e* contacting the rack 194*b* at the engagement position is provided on the claw 195*c*.

Using a second positioning mechanism 193*b* so configured, when the bolt member 145 is loosened and the compression operation part 195*d* is pressed to move the claw member 195*b* to the release position, the engagement of the claw member 195*b* and the rack 194*b* is released, and the second crank shaft attachment part 136*b* becomes capable of moving with respect to the second pedal attachment part 134*b* in the lengthwise direction. When the second crank shaft attachment part 136*b* is moved to a desired crank length, the compression operation part 195*d* is released. When the user's hand is removed from the compression operation part 195*d*, the biasing member 197 returns the claw member 195*b* to the engagement position. Finally, two bolt members 145 are tightened to complete the process of adjusting the crank arm. It is thereby possible to adjust the length of the second crank arm 120*b*, allowing a crank length that is optimal for the user to be obtained.

For the first crank arm 120*a*, the crank shaft attachment part, not shown in the drawing, is not anchored by the tightening bolt 146*b* to the crank shaft 112 of the first slit 137*c*; rather, the first end 112*a* of the crank shaft 112 is anchored via press-fitting or bonding. All other features are similar to those of the second crank arm 120*b*, and the length of the first crank arm 120*a* can be adjusted in a similar manner.

For the second crank arm 120*b* of the present embodiment, the longitudinal direction length of the second crank arm 120*b* can be adjusted simply by loosening the bolt member 145 and pressing the compression operation part 195*d*. The user is thus capable of adjusting the length of the crank arm via a simple operation. Because a rack 194*b* and claw member 195*b* are used as a positioning mechanism, fine adjustments in length can be made as needed.

Figure 17:
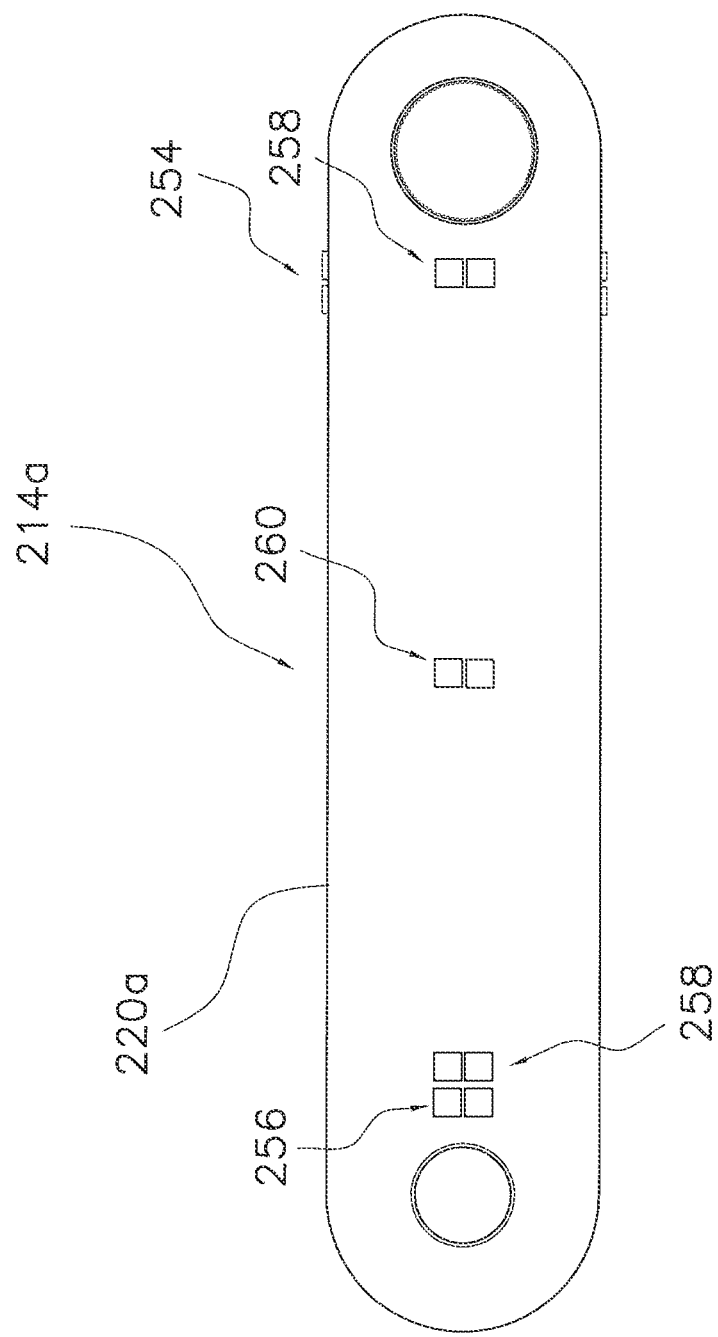
FIG. 17 is an illustration corresponding to FIG. 2 for another embodiment.

Other Embodiments (a) In the embodiments described above, the strain-flexing part is provided separately from the first crank arm. However, in a first pedaling force measurement device 214*a*, it is also acceptable for the strain-flexing part to be formed integrally with a first crank arm 220*a*, as a one-piece, unitary member as shown in FIG. 17. In other words, in FIG. 17, the first pedaling force measurement device 214*a* is a non-removable part of the first crank arm 220*a*. In FIG. 17, strain gauge elements constituted by a first strain sensor 254, a second strain sensor 256, a third strain sensor 258, and a fourth strain sensor 260 are applied to the outer surface of a first crank arm 220*a*. However, in the case of a hollow crank arm—for example, a bisected crank arm—strain gauge elements may also be applied to an inner surface of the crank arm.

(b) The strain gauge elements constituting the strain sensors are not limited to thin-film, capacitive, or semiconductor types; any type capable of detecting strain in the crank arm or strain-flexing part is acceptable.

(c) In the embodiments described above, the strain-flexing part body is constituted by a quadrangular prism, but the present invention is not limited to such. Any shape is possible as long as it has, for example, at least two orthogonally disposed surfaces. For example, the strain-flexing part body may be a square pipe or an octagonal prism. Moreover, the strain-flexing part body may also be a member having a cross section orthogonal to the lengthwise direction that is T-shaped, I-shaped, H-shaped, or U-shaped, and extending in the longitudinal direction.

(d) In the embodiment described above, the present invention has been described using an example of a pedaling force measurement device for a bicycle, but the present invention is not limited to such. For example, the present invention can also be applied to exercise devices having a crank arm to which pedals or other operational parts can be attached for the purpose of maintaining or increasing physical strength, such as an exercise bike.

(e) In the embodiments described above, the interference suppression part comprises both a first interference suppression part for computationally suppressing interference by computing detected values for the strain sensors and a second interference suppression part for physically suppressing interference, but the present invention is not limited to such. A configuration provided with at least one of the first interference suppression part and the second interference suppression part as a pedaling force measurement device is acceptable.

(f) In the embodiments described above, the strain sensors are constituted by four strain gauge elements apiece so as to perform temperature compensation, but, if temperature compensation is not necessary, it is also acceptable for the strain sensors to be constituted by two strain gauge elements apiece. In such cases, temperature compensation may be performed using a different sensor, such as a temperature sensor.

(g) In the embodiments described above, the first crank arm 20a is a constituent feature of the first pedaling force measurement device 14a, but the first crank arm 20a need not be a constituent feature of the first pedaling force measurement device 14a.

(h) In the embodiments described above, the strain-flexing part 22 is detachably provided on the first crank arm 20a, but the strain-flexing part 22 may also be undetachably anchored to the first crank arm 20a using an adhesive or the like.

(i) In the embodiments described above, the first cover 43a is provided from the one end 31a1 of the first crank arm 20a in the longitudinal direction to an other end 31a so as to entirely cover one side of the first arm body 30a, but it is also acceptable for the first cover 43a to cover only the first housing part 38a.

(j) In the embodiments described above, the anchoring holes 40a are formed as screw holes, but the anchoring holes 40a may also be through-holes. In such cases, the anchoring holes 51a of the anchor portions 51 need only be formed as screw holes, and the first arm body 30a be sandwiched between the heads of the bolts and the anchor portions 51.

(k) In the first embodiment, an opening is formed in the direction opposite the bicycle in the direction in which the crank shaft extends when the crank assembly 10 is attached to a bicycle, but it is also acceptable for the first housing part 38a to open towards the bicycle.

It is also acceptable thr the first housing part 38a to open facing upstream or downstream in the rotational direction of the first crank arm 20a; that is, in either of the longitudinal direction of the crank arm and a direction perpendicular to the pedal shaft. In such cases, the first housing part 38a need only be anchored to the strain-flexing part 22 via a method similar to that of the second embodiment.

(l) In the embodiments described above, cadence sensors are provided on each of the crank arms, but it is also acceptable for a cadence sensor to be provided on only one of the crank arms. It is also acceptable to provide the crank arm with a sensor for detecting the rotational position of the crank arm instead of a cadence sensor.

(m) In the embodiments described above, one each of a computing processor, a wireless communication unit, and a power source are provided, but it is also acceptable to provide a computing processor, a wireless communication unit, and a power source on each of the crank arms.

(n) In the second embodiment, it is preferable to use a separate spring member, ball plunger mechanism, or the like to bias the claw 195c toward the rack 194b, thereby allowing the user to feel clicks when adjusting length. In such cases, it is acceptable to provide the claw member 195b which a ball plunger mechanism directly engaging with the rack 194b instead of using a separate biasing mechanism to bias the claw 195c toward the rack 194b.

(o) In the second embodiment, the rack 194b is a separate member anchored to the second guide shaft 191b, but the present invention is not limited to such. For example, it is also acceptable to directly form a plurality of grooves in the surface of the second guide shaft 191b, forming the rack 194b integrally with the second guide shaft 191b.

(p) In the second embodiment, a bolt member 145 is used to finally anchor the crank arm length, but the present invention is not limited to such. For example, a click-release mechanism used to attach to and detach from the frame of the bicycle wheel may be used instead of a bolt member.

While only selected embodiments have been chosen to illustrate the present invention, it will be apparent to those skilled in the art from this disclosure that various changes and modifications can be made herein without departing from the scope of the invention as defined in the appended claims. In particular, the various embodiments and modifications described in the present specification can be arbitrarily combined as necessary. Thus, the foregoing descriptions of the embodiments according to the present invention are provided for illustration only, and not for the purpose of limiting the invention as defined by the appended claims and their equivalents.

What is claimed is:

1. A pedaling force measurement device for measuring a plurality of parameters of pedaling force acting on a crank arm, the pedaling force measurement device comprising:
   a strain-flexing part configured to receive a strain acting on the crank arm from pedaling, the strain-flexing part being disposed entirely on the crank arm;
   a parameter detection part disposed on the strain-flexing part to detect the parameters from the strain acting on the strain-flexing part; and
   an interference suppression part configured to suppress interference from one parameter detected by the parameter detection part from other ones of the parameters.

2. The pedaling force measurement device according to claim 1, wherein
   the parameter detection part comprises:
   a second strain sensor configured to detect a second force component, corresponding to a crank arm longitudinal force component of a bending moment due to a load acting upon the crank arm from pedaling, as one of the parameters; and
   a third strain sensor configured to detect a third force component, corresponding to a pedal axial direction force component of the bending moment due to the load acting upon the crank arm from pedaling, as one of the parameters.

3. The pedal force measurement device according to claim 2, wherein
   the parameter detection part comprises:
   a first strain sensor configured to detect a first force component, corresponding to a rotational direction force component of the bending moment due to the load acting upon the crank arm from pedaling, as one of the parameters; and
   a fourth strain sensor configured to detect a fourth force component, corresponding to a shear force the load acting upon the crank arm, as one of the parameters to determine an axial direction load position from pedaling.

4. The pedaling force measurement device according to claim 3, wherein
each of the first through fourth strain sensors comprises at least vo strain gauge elements forming a Wheatstone bridge circuit.

5. The pedaling force measurement device according to claim 3, wherein
each of the first through fourth strain sensors comprises four strain gauge elements forming a Wheatstone bridge circuit.

6. The pedaling force measurement device according to claim 5, wherein
the strain-flexing part has a first surface, a second surface, a third surface and a fourth surface extending in a longitudinal direction of the crank arm;
the first surface and the fourth surface are substantially perpendicular to a shaft of the pedal; and
the second surface and the third surface are substantially parallel to the shaft of the pedal.

7. The pedaling force measurement device according to claim 6, wherein
the strain-flexing part comprises a quadrangular prism.

8. The pedaling force measurement device according to claim 6, wherein
the four strain gauge elements forming the third strain sensor are disposed on one of the first and fourth surfaces of the strain-flexing part;
the Wheatstone bridge circuit of the third strain sensor has a first pair of oppositely disposed strain gauge elements of the four strain gauge elements of the third strain sensor and a second pair of oppositely disposed strain gauge elements of the four strain gauge elements of the third strain sensor;
the first pair of oppositely disposed strain gauge elements being spaced from the second pair of oppositely disposed strain gauge elements in the longitudinal direction of the crank arm; and
the first and second pairs of oppositely disposed strain gauge elements being symmetrically disposed with respect to a longitudinal neutral axis of the strain-flexing part.

9. The pedaling force measurement device according to claim 6, wherein
the four strain gauge elements forming the third strain sensor are disposed on one of the first and fourth surfaces of the strain-flexing part;
the Wheatstone bridge circuit of the third strain sensor has first, second, third and fourth strain gauge elements forming the four strain gauge elements of the third strain sensor;
the first and third strain gauge elements being oppositely disposed from each other in the Wheatstone bridge circuit of the third strain sensor, the second and fourth strain gauge elements being disposed between the first and third strain gauge elements;
the first and third strain gauge elements being symmetrically disposed with respect to a longitudinal neutral axis of the strain-flexing part and disposed at one end of the strain-flexing part; and
the second and fourth strain gauge elements being symmetrically disposed with respect to the longitudinal neutral axis of the strain-flexing part and disposed at the other end of the strain-flexing part.

10. The pedaling force measurement device according to claim 6, wherein
the four strain gauge elements forming the first strain sensor are disposed on one end of the strain-flexing part;
the Wheatstone bridge circuit of the first strain sensor has first, second, third and fourth strain gauge elements forming the four strain gauge elements of the first strain sensor;
the first and third strain gauge elements being oppositely disposed from each other in the Wheatstone bridge circuit of the first strain sensor, the second and fourth strain gauge elements being disposed between the first and third strain gauge elements;
the first and third strain gauge elements being disposed on one of the second and third surfaces, while the second and fourth strain gauge elements being disposed on the other of the second and third surfaces;
the first and third strain gauge elements being symmetrically disposed with respect to a longitudinal neutral axis of the strain-flexing part; and
the second and fourth strain gauge elements being symmetrically disposed with respect to the longitudinal neutral axis of the strain-flexing part.

11. The pedaling force measurement device according to claim 6, wherein
the four strain gauge elements forming the first strain sensor are disposed on one end of the strain-flexing part;
the Wheatstone bridge circuit of the first strain sensor has first, second, third and fourth strain gauge elements forming the four strain gauge elements of the first strain sensor;
the first and third strain gauge elements being oppositely disposed from each other in the Wheatstone bridge circuit of the first strain sensor, the second and fourth strain gauge elements being disposed between the first and third strain gauge elements;
the first and third strain gauge elements being disposed on one of the second and third surfaces, while the second and fourth strain gauge elements being disposed on the other of the second and third surfaces;
the first and third strain gauge elements being aligned in the longitudinal direction of the strain-flexing part; and
the second and fourth strain gauge elements being aligned in the longitudinal direction of the strain-flexing part.

12. The pedaling force measurement device according to claim 6, wherein
the four strain gauge elements forming the second strain sensor are disposed on one end of the strain-flexing part;
the Wheatstone bridge circuit of the first strain sensor has first, second, third and fourth strain gauge elements forming the four strain gauge elements of the second strain sensor;
the first and third strain gauge elements being oppositely disposed from each other in the Wheatstone bridge circuit of the second strain sensor, the second and fourth strain gauge elements being disposed between the first and third strain gauge elements;
the first and third strain gauge elements being disposed on one of the first and fourth surfaces, while the second and fourth strain gauge elements being disposed on the other of the first and fourth surfaces;
the first and third strain gauge elements being symmetrically disposed with respect to a longitudinal neutral axis of the strain-flexing part; and
the second and fourth strain gauge elements being symmetrically disposed with respect to the longitudinal neutral axis of the strain-flexing part.

13. The pedaling force measurement device according to claim 6, wherein
the four strain gauge elements forming the fourth strain sensor are disposed at a center area of the strain-flexing part with respect to the longitudinal direction of the strain-flexing part;
the Wheatstone bridge circuit of the first strain sensor has first, second, third and fourth strain gauge elements forming the four strain gauge elements of the fourth strain sensor;
the first and third strain gauge elements being oppositely disposed from each other in the Wheatstone bridge circuit of the fourth strain sensor, the second and fourth strain gauge elements being disposed between the first and third strain gauge elements;
the first and second strain gauge elements being disposed on one of the first and fourth surfaces, while the third and fourth strain gauge elements being disposed on the other of the first and fourth surfaces;
the first and second strain gauge elements being symmetrically disposed with respect to a longitudinal neutral axis of the strain-flexing part; and
the third and fourth strain gauge elements being symmetrically disposed with respect to the longitudinal neutral axis of the strain-flexing part.

14. The pedaling force measurement device according to claim 6, wherein
the four strain gauge elements forming the fourth strain sensor are disposed at a center of the strain-flexing part with respect to the longitudinal direction of the strain-flexing part;
the Wheatstone bridge circuit of the first strain sensor has first, second, third and fourth strain gauge elements forming the four strain gauge elements of the fourth strain sensor;
the first and third strain gauge elements being oppositely disposed from each other in the Wheatstone bridge circuit of the fourth strain sensor, the second and fourth strain gauge elements being disposed between the first and third strain gauge elements;
the first, second, third and fourth strain gauge elements being disposed on one of the first and fourth surfaces;
the first and second strain gauge elements being symmetrically disposed with respect to a longitudinal neutral axis of the strain-flexing part; and
the third and fourth strain gauge elements being symmetrically disposed with respect to the longitudinal neutral axis of the strain-flexing part.

15. The pedaling force measurement device according to claim 1, wherein
the interference suppression part is formed at a location that is displaced from a central position in a longitudinal direction of the crank arm towards a pedal mounting end of the strain-flexing part, and an area of the location of the interference suppression part has a cross section orthogonal to the longitudinal direction that is different than elsewhere along the crank arm.

16. The pedaling force measurement device according claim 15, wherein
the interference suppression part includes a through-hole formed in the strain-flexing part.

17. The pedaling force measurement device according to claim 1, wherein
the strain-flexing part is provided separately from the crank arm.

18. The pedaling force measurement device according to claim 1, further comprising
a crank arm.

19. The pedaling force measurement device according to claim 18, wherein
the strain-flexing part is integrally formed with the crank arm.

20. A pedaling force measurement device for measuring a plurality of parameters of pedaling force acting on a crank arm, the pedaling force measurement device comprising:
a strain-flexing part configured to receive a strain acting on the crank arm from pedaling;
a parameter detection part disposed on the strain-flexing part to detect the parameters from the strain acting on the strain-flexing part, the parameter detection part comprising
a second strain sensor configured to detect a second force component, corresponding to a crank arm longitudinal force component of a bending moment due to a load acting upon the crank arm from pedaling, as one of the parameters,
a third strain sensor configured to detect a third force component, corresponding to a pedal axial direction force component of the bending moment due to the load acting upon the crank arm from pedaling, as one of the parameters; and
a interference suppression part configured to suppress interference from one parameter detected by the parameter detection part from other ones of the parameters, the interference suppression part being programmed to perform a computational process to suppress interference from the third force component outputted from the third strain sensor while detecting the second force component based on outputs of the second strain sensor.

21. A pedaling force measurement device for measuring a plurality of parameters of pedaling force acting on a crank arm, the pedaling force measurement device comprising:
a strain-flexing part configured to receive a strain acting on the crank arm from pedaling;
a parameter detection part disposed on the strain-flexing part to detect the parameters from the strain acting on the strain-flexing part, the parameter detection part comprising
a first strain sensor configured to detect a first force component, corresponding to a rotational direction force component of the bending moment due to the load acting upon the crank arm from pedaling, as one of the parameters,
a second strain sensor configured to detect a second force component, corresponding to a crank arm longitudinal force component of a bending moment due to a load acting upon the crank arm from pedaling, as one of the parameters,
a third strain sensor configured to detect a third force component, corresponding to a pedal axial direction force component of the bending moment due to the load acting upon the crank arm from pedaling, as one of the parameters, and
a fourth strain sensor configured to detect a fourth force component, corresponding to a shear force the load acting upon the crank arm, as one of the parameters to determine an axial direction load position from pedaling; and
an interference suppression part configured to suppress interference from one parameter detected by the parameter detection part from other ones of the parameters, the interference suppression part being programmed to perform a computational process to suppress interference from the third force component based on outputs of the first, second, third and fourth strain sensors.

22. A pedaling force measurement device for measuring a plurality of parameters of pedaling force acting on a crank arm, the pedaling force measurement device comprising:
- a crank arm comprising a pedal attachment part for attaching a pedal, a crankshaft attachment part for attaching a crankshaft and a crank length adjustment mechanism adjustably coupling the pedal attachment part to the crankshaft attachment part for altering relative positions of the pedal attachment part and the crankshaft attachment part in a longitudinal direction of the crank arm;
- a strain-flexing part configured to receive a strain acting on the crank arm from pedaling;
- a parameter detection part disposed on the strain-flexing part to detect the parameters from the strain acting on the strain-flexing part; and
- an interference suppression part configured to suppress into interference from one parameter detected by the parameter detection part from other ones of the parameters.

23. The pedaling force measurement device according to claim 22, wherein
- the strain-flexing part is attached to the pedal attachment part.

* * * * *